(12) United States Patent
Sharma et al.

(10) Patent No.: US 8,714,442 B2
(45) Date of Patent: May 6, 2014

(54) SYSTEM FOR AND METHOD OF SECURING ARTICLES ALONG A SUPPLY CHAIN

(75) Inventors: Satya Prakash Sharma, East Setauket, NY (US); Robert James Hart, Frisco, TX (US)

(73) Assignee: Zortag Inc, Great Neck, NY (US)

( * ) Notice: Subject to any disclaimer, the term of this patent is extended or adjusted under 35 U.S.C. 154(b) by 0 days.

(21) Appl. No.: 13/450,946

(22) Filed: Apr. 19, 2012

(65) Prior Publication Data

US 2013/0277425 A1   Oct. 24, 2013

(51) Int. Cl.
| | | |
|---|---|---|
| *G06F 17/00* | (2006.01) | |
| *G06F 7/00* | (2006.01) | |
| *G06Q 30/00* | (2012.01) | |
| *G06K 19/06* | (2006.01) | |

(52) U.S. Cl.
USPC ........... 235/376; 235/375; 235/385; 235/494; 705/28; 700/225; 700/226

(58) Field of Classification Search
CPC .............. G06K 7/10; G06K 19/06112; G06K 19/06037; G06K 19/06084; G06K 19/0614
USPC .......................... 235/375–376, 385, 454, 494; 705/14.24, 28, 333; 700/225–226
See application file for complete search history.

(56) References Cited

U.S. PATENT DOCUMENTS

| | | | |
|---|---|---|---|
| 5,483,363 A | 1/1996 | Holmes et al. | |
| 5,694,229 A | 12/1997 | Drinkwater et al. | |
| 5,768,384 A | 6/1998 | Berson | |
| 6,456,729 B1 | 9/2002 | Moore | |
| 7,725,397 B2 | 5/2010 | Deolalikar et al. | |
| 8,028,891 B2 | 10/2011 | Harjani | |
| 2003/0139968 A1 | 7/2003 | Ebert | |
| 2005/0060171 A1 | 3/2005 | Molnar | |
| 2005/0097054 A1 | 5/2005 | Dillon | |
| 2006/0242086 A1 | 10/2006 | Deolalikar et al. | |
| 2006/0255953 A1 * | 11/2006 | Lyon et al. ................. | 340/572.8 |
| 2007/0156281 A1 | 7/2007 | Leung et al. | |
| 2007/0179978 A1 | 8/2007 | Lee et al. | |
| 2007/0228166 A1 | 10/2007 | Lui | |
| 2009/0021788 A1 | 1/2009 | Hoffman et al. | |
| 2009/0051485 A1 | 2/2009 | Corry et al. | |
| 2009/0057421 A1 * | 3/2009 | Suorsa et al. ................. | 235/494 |
| 2009/0169019 A1 | 7/2009 | Bauchot et al. | |
| 2011/0225101 A1 | 9/2011 | Dillon | |
| 2011/0254731 A1 | 10/2011 | Musmecci | |
| 2012/0030067 A1 * | 2/2012 | Pothukuchi et al. ....... | 705/26.81 |
| 2013/0022238 A1 * | 1/2013 | Wood et al. .................. | 382/103 |

FOREIGN PATENT DOCUMENTS

WO   9318419   9/1993

* cited by examiner

*Primary Examiner* — Michael G Lee
*Assistant Examiner* — Laura Gudorf
(74) *Attorney, Agent, or Firm* — Kirschstein et al.

(57) ABSTRACT

A system and method for securing articles of commerce passing through points along a supply chain against theft, diversion, product overruns, counterfeiting and like unauthorized activity, capture authentication information and identification information associated with the articles with an interrogation device at one or more points in the supply chain. The articles may be authenticated from the captured authentication information as being authorized or unauthorized at each point, and may be identified from the captured identification information at each point. Transactional information about the article, e.g., authorized/unauthorized status and a time and place of the authentication, is reported to a brand manager/law enforcement.

20 Claims, 17 Drawing Sheets

| Brand/manufacturer ID | | | | | Brand Name and Address | | | |
|---|---|---|---|---|---|---|---|---|
| Date/Time Period | | | | | Other Information | | | |
| Product ID Logistic ID Shipment ID | ID in Label Server | Activated | Authentication Confirmed | Supply Chain Location ID | Time | | Date | Other info |
| Product XXXXXX | Yes | Yes | Yes | New York | | | | |
| | No | No | No | New York | | | | |
| | No | No | No | Los Angeles | | | | |
| | Yes | Yes | Yes | Dallas | | | | |
| | No | No | Yes | Mumbai | | | | |
| Logistical Unit YYYYYY | Yes | Yes | No | | | | | |
| | Yes | Yes | Yes | Beijing | | | | |
| | Yes | No | No | | | | | |
| | No | No | Yes | Los Angeles | | | | |
| Shipment ZZZZZZ | Yes | Yes | No | | | | | |
| | No | No | No | New York | | | | |
| | No | No | No | | | | | |

Fig. 15

SYSTEM FOR AND METHOD OF SECURING ARTICLES ALONG A SUPPLY CHAIN

FIELD OF THE DISCLOSURE

The present disclosure relates generally to tracking, tracing and authenticating articles of commerce, such as products or trade items, logistical units for conveying the products, services, documents relating to the products/services, and the like, that pass between a source point and a destination point through a plurality of intermediate points along a supply chain to secure the same against theft, diversion, overruns, counterfeiting and like unauthorized activity, by using labels/tags attached to, or associated with, such articles, each label/tag having unique identification information to identify each article, and unique authentication information to indicate whether each article is authorized, e.g., genuine, or unauthorized.

BACKGROUND

An article of commerce (e.g., a product or trade item, a logistical unit for conveying the product, a service, a document relating to the product/service, and the like) is delivered by a brand owner from a manufacturer to a user through a multi-point logistical network that is commonly known in the art as a supply chain. Modern supply chains are quite complex and encompass multiple companies as brand owners/organizations/companies attempt to manage the movement of raw materials to finished trade items, and then through various distribution channels and intermediaries and retailers to users or end customers. Very few brand owners these days have tight management control over all aspects of the supply chain and its logistical operations as the brand owners tend to focus on their core competencies. Brand owners typically outsource a large number of supply chain operations, e.g., manufacturing or distribution channels or raw materials supply, to those whose core competencies are superior to their own. The supply chain not only includes the manufacturers and suppliers of the articles, but also the transporters, warehouses, central distributors, regional distributors, retailers and end customers themselves. More than one entity may be involved at each site, location, or like point of the supply chain.

Brand owners, however, must track their articles as the articles move through the supply chain to assure that their articles are being distributed and traded in a lawful manner. Without having a secure supply chain that cannot be compromised by unscrupulous parties, it is difficult for brand owners to be certain that the consumers are indeed receiving authorized or genuine articles through channels authorized and approved by the brand owners.

Hence, the securement of articles from authorized manufacturing sites of brand owners to distributors, and then to retailers, and finally to end customers, is of paramount importance, especially to thwart article counterfeiting, diversion, theft and product overrun of the articles in the supply chain. Brand owners have tried various methods to assure the security and integrity of their supply chains. Some of these methods have employed security seals, wax seals, armed escorts and guards, markings of various kinds, trusted and authorized distributors and retailers, cryptographic certificates, mechanical and electronic means, radio frequency identification (RFID) reader-based systems, barcode reader-based systems, and computer-based systems, etc. However, counterfeiters, thieves, product diverters, product overflow companies and like parties have also become quite sophisticated in compromising these security systems. As a result, serious problems continue to plague the security and integrity of supply chains.

In addition to providing security during article distribution, there is also a need to combat counterfeiting of articles entering the supply chain at various points therein. This requires monitoring the entire chain of distribution. The raw materials and components for manufacturing products may come from a variety of sources. Sub-assemblies may be produced by subcontractors in different parts of the world, and the final assembly and packaging may take place in another part of the world before being distributed in markets around the globe. It is, therefore, highly likely that a large number of parties have access to the articles along the supply chain. Therefore, it is essential that article security be assured along the entire chain of commerce.

One major cause of concern to brand owners is product overruns. Brand owners typically have their products manufactured in different parts of the world. Some of their products are manufactured in captive locations of the brand owners; some products are outsourced/subcontracted to contract manufacturers; and some products are produced under a license by third parties. This may be to meet the needs of a local market, or due to lack of capacity, or due to lower labor and material costs in certain parts of the world. One month a product may be manufactured in one part of the world, and the following month the same product may be manufactured in another factory in another part of the world due to a shortage of raw materials, regional conflicts, customs problems, shifts in customer demands, labor strikes, and transportation and labor costs. Sometimes, a product may be manufactured in several countries by these different manufacturing enterprises at the same time, and the brand owners then have to manage their products as they move into the distribution chains in different countries. Sometimes some of these subcontractors produce more than the quantity requested by the brand owners. The additional products, also known as product overruns, produced in this manner are then distributed through unauthorized/illegal channels depriving the brand owners of their just revenue and profit.

Article diversion is another major issue faced by a brand owner and typically takes place during the distribution of articles on a global scale. For example, brand owners may want to increase their sales in untapped countries and emerging economies. The prices they charge in these markets are substantially lower than in their established markets. Some unscrupulous companies who specialize in export diversion buy branded products intended for untapped foreign markets at deep discounted prices. They then divert or ship these products into established markets and illegally resell them to dealers and retailers in the established markets for a significant profit and, in turn, deprive the brand owners of their rightful revenue and profit. For example, pharmaceutical products intended for a poor country can be repackaged and diverted and exported to another country where the price may be much higher.

Product diversion may also be due to other causes. For example, a high-end company may contract with a high-end retailer or class of trade to sell their products to protect their reputation. A contractual clause may require that the products should not be sold outside of the high-end retailer. However, the products may sometimes be diverted to low-end discount stores. This can occur, for example, if the products in the high-end store are not moving, and there is an excess inventory. It is difficult, however, to find out which high-end retailer was responsible for product diversion.

Unauthorized product diversion may also take place to avoid taxes. For example, products manufactured and sold at one location may be subject to controls and taxes, etc., while these controls and taxes may be much less at another location. As such, products may be illegally distributed, diverted and smuggled to avoid taxes. It is well known that governments all over the world lose tax revenue, e.g., excise tax, from illegal import of trade items and cross border trading (e.g., tobacco, foods, alcohol, pharmaceuticals, etc.). This problem has reached a monumental scale and, in addition, excise tax evasion also contributes to income tax evasion and creates a black market economy. Governments have tried various methods such as excise stamps applied to every trade item. However, excise stamps can be counterfeited. A database to record the tracking of legal products during the route from the source point of origin to the destination point is lacking. The problem of identifying the origin of the products and tracking their movement from the source point to the consumers, therefore, extends worldwide. For example, it may be desirable to know whether a particular product passed through a specific point in the supply chain, such as customs ports of a country, or the points where the product was manufactured.

Still another problem of importance is that of theft in the supply chain. Vans and trucks carrying high value goods such as expensive apparel, alcohols, and accessories are often hijacked. Their contents are then often split up and delivered to merchants without any trace.

In addition to product overruns, diversion and theft at various points in the supply chain, another major problem is that of counterfeit products entering the supply chain in multiple ways. It is becoming very difficult for the brand owners to find out where the counterfeit products are entering in their supply chains. Honest freight consolidators, central distributors, regional distributors, and retailers have no way of knowing if a shipment of the products that they received for further movement along the supply chain is really authorized or authentic.

Problems of counterfeiting are worsening due to globalization, causing loss of revenue for brand owners, and threatening intellectual property rights and investment in research and development. Counterfeiting also carries a negative impact on a brand image when customers realize that the quality of the branded product may not be what they have paid for. As factories around the world become proficient in manufacturing, counterfeiters have also become more sophisticated. It often takes real experts to recognize a counterfeit product from a genuine one.

Finally, consumers have little way of knowing whether the products that they bought are authorized or unauthorized. If a consumer bought a product believing the product to be authentic, and then, if not satisfied, attempts to return the product to the brand owner, then the consumer will be frustrated if the brand owner refuses to accept the product. At times, the brand owner may not be able to differentiate a genuine product from a fake returned product. This causes increased warranty and repair costs for the brand owner in addition to lost reputation. There have been instances where the brand owner had to recall products from the market, because it was difficult for the brand owner to prove that the products the consumers bought were not their products. There are also regulatory requirements that the brand owners must protect their supply chains.

In general, the existing methods of securing a supply chain fall into two main categories: a type of track and trace technology, and a type of anti-counterfeiting technology. In the track and trace method, barcoded labels or RFID tags were typically used to track the movement of articles along the supply chain. For example, package delivery companies routinely tracked their packages by reading package labels/tags with electro-optical imagers or scanners at various points, e.g., distribution centers, in the supply chain, and the information, about the packages and the geographical information of the distribution center where the packages were read, was input into a database. Any individual can retrieve the information about where his/her package is at anytime by logging in into the delivery company's web site through the Internet, and accessing the database. However, RFID tags can be tampered with by unscrupulous parties, and barcoded labels can be easily copied. Barcodes and RFID technology can identify, but not authenticate, the package.

The art has tried to modify and combine barcodes, RFID, decryption and like approaches to further strengthen the track and trace method. However, a counterfeiter may simply copy the unique codes and produce multiple products with the same unique code. None of the present technologies are effective in either preventing counterfeiting, diversion, product overruns or theft, or in preventing any unauthorized articles from entering the supply chain. Also, it is essential that the system and method used in tracking and authenticating products during movement along the supply chain be user friendly, because the skill sets of individuals in the supply chain are typically very low, and the speed of authentication is critical. To date, brand owners have no tools to track the integrity of the supply chain in real time, or to know the location and time where and when the supply chain has been breached. This invention makes every individual or scanner that tracks an article of commerce a quality inspector to track, trace and authenticate the article of commerce at any location and at any time.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 15 is an exemplary database structure generated by the system of FIG. 11.

Figure 1:
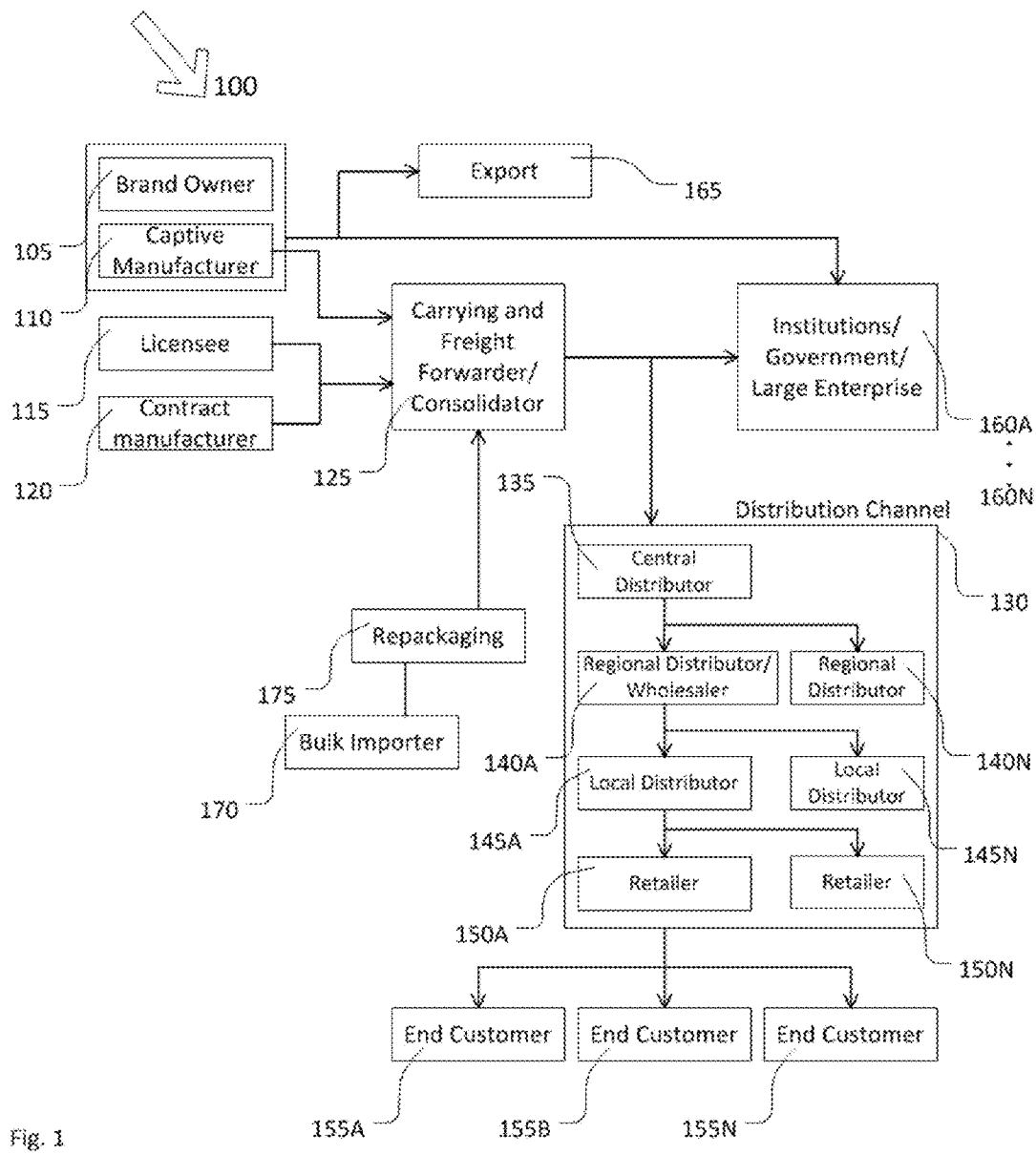
FIG. 1 is a block diagram of a supply chain to be secured in accordance with this invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. Some of the elements may be combined into smaller subsets or further broken down during implementation.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 illustrates a supply chain 100 along which articles of commerce are moved through a plurality of points or nodes arranged along the supply chain 100. An "article of commerce" as used in this disclosure is defined as one or more products, objects, goods, and like trade items that are bought by, or for, users, e.g., end customers; one or more logistical units for conveying one or more of the products, e.g., packages that contain individual product(s), cartons that contain one or more packages, pallets that contain one or more cartons, containers that contain one or more pallets, and shipments that contain one or more containers; one or more services; and one or more documents that include details about the products/services. The supply chain 100 of FIG. 1 shows authorized movement of the articles of commerce assuming that all parties participating in the supply chain are abiding by prevailing laws and contractual obligations entered between the respective parties.

The movement can begin from a source point or a brand owner 105 who wishes to provide the articles to a destination point or end retail customers 155A, 155B, ... 155N and/or to institutional customers 160A ... 160N. In modern commerce, to meet the needs of the global marketplace, the brand owner 105 often has to rely on complex interconnected distribution channels and multi-sourced manufacturing entities. As an example, the end retail customer's needs are typically directly met by retailers 150A ... 150N. Depending upon the reception of the brand owner's product in the market place, the retailers 150A ... 150N and the institutional customers 160A ... 160N place purchase orders with the brand owner 105.

In response to these purchase orders or in anticipation of the emerging needs in the market place for its products, the brand owner 105 may instruct its own captive manufacturer 110 or its partners worldwide to manufacture the products to meet existing or anticipated needs for its products. The captive manufacturer 110 may be spread over multiple geographical sites around the world. These captive manufacturing sites/entities are managed and controlled by the brand owner 105, or the enterprise that controls the brand. In addition to captive manufacturing sites, the brand owner 105 may also contract one or more licensee manufacturers 115 or job shops to manufacture its products. Job shops may get paid for usage of the facilities and production costs plus a profit margin. The brand owner 105 may also contract with one or more contract manufacturers 120 to manufacture its products independently. The contract manufacturer 120 transfers the manufactured products on a transfer price basis, procures its own materials, and controls the quality, manufacture and packaging of the products. Brand owners in this latter case control only the marketing and selling of the products.

After the products are manufactured, pertinent information about the products, e.g., the brand owner's name, product type, agency approvals (such as UL, FDA, FCC, etc.), if appropriate, and other instructions about the products, are provided through an identification media (such as a coded label or a tag) affixed, imprinted, or included in, or with, the products during manufacturing. These coded tags or labels identify the products during movement through the supply chain and in sales to customers. Sometimes these labels/tags are produced by the manufacturers under the contract with the brand owner 105, and sometimes they are produced by an outside company specializing in making the labels/tags. These labels/tags are then shipped to manufacturers 110, 115, 120 for affixing them onto the products. Manufacturing companies then pack these products into packages, cartons, pallets, containers, and shipments (collectively referred to as logistical units, and depicted and described below in connection with FIGS. 2-3), and move them further along the supply chain. Labels/tags may also be affixed to the logistical units, as described below.

The packed and labeled/tagged logistical units are transferred from manufacturers 110, 115, 120 to a carrying and freight forwarders/consolidator 125 for shipment. Sometimes, the brand owner 105 may import articles from another country's manufacturing location, as shown by bulk importer 170, for distributing its articles into a local market. The imported articles can be repackaged into different logistical units by repackagers 175 and forwarded to the freight consolidator 125 for further distribution.

The freight consolidator 125 utilizes a complex, interconnected, distribution channel 130. The labeled/tagged logistical units may be transferred by the freight consolidator 125 to a central distributing facility 135, which may also buy the labeled/tagged logistical units directly from the brand owner, and then distribute the labeled/tagged logistical units to regional distributors/wholesalers 140A ... 140N and to local distributors 145A ... 145N and, in turn, to retailers 150A ... 150N or their warehouses. The central distributor 135 may also distribute the labeled/tagged logistical units directly to the retailers 150A ... 150N or their warehouses. The freight consolidator 125 may also distribute the labeled/tagged logistical units directly to the regional distributors 140A ... 140N or to the local distributors 145A ... 145N.

If necessary, the logistical units may be opened at the central distributor 135, the regional distributors 140A ... 140N, or the local distributors 145A ... 145N, and repackaged into smaller logistical units as needed by the retailers 150A ... 150N, or by other distribution units in the supply chain. The regional and local distributors may also buy the articles from the central distributor 135, or directly from the brand owner 105, or from the freight consolidator 125, and then sell the articles to the retailers 150A ... 150N, as needed.

Typically, the inventory of the articles held by the regional and local distributors is much less than that held by the central distributor.

Institutional users 160A . . . 160N, such as governmental organizations and agencies, wholesale clubs, and large enterprises may buy the articles directly from the brand owner 105, or through the freight consolidator 125 to meet the needs of their members in an economical manner. The brand owner 105 may also work with exporters 165 to export the articles into various markets around the world.

It should be clear from the foregoing description of FIG. 1 that it is very difficult for the brand owner 105 to tightly manage the complex supply chain 100 on a global basis, because there are numerous sites, locations, and like points where the supply chain can be broken by unscrupulous parties. Unauthorized, counterfeit, or diverted articles, or product overruns, can enter and exit the supply chain at any point. Authorized/genuine articles may exit and be diverted into unauthorized/illegal channels at any point. The more complex and lengthy the supply chain 100 is, the more possibilities exist for unauthorized activity to flourish.

Figure 2:
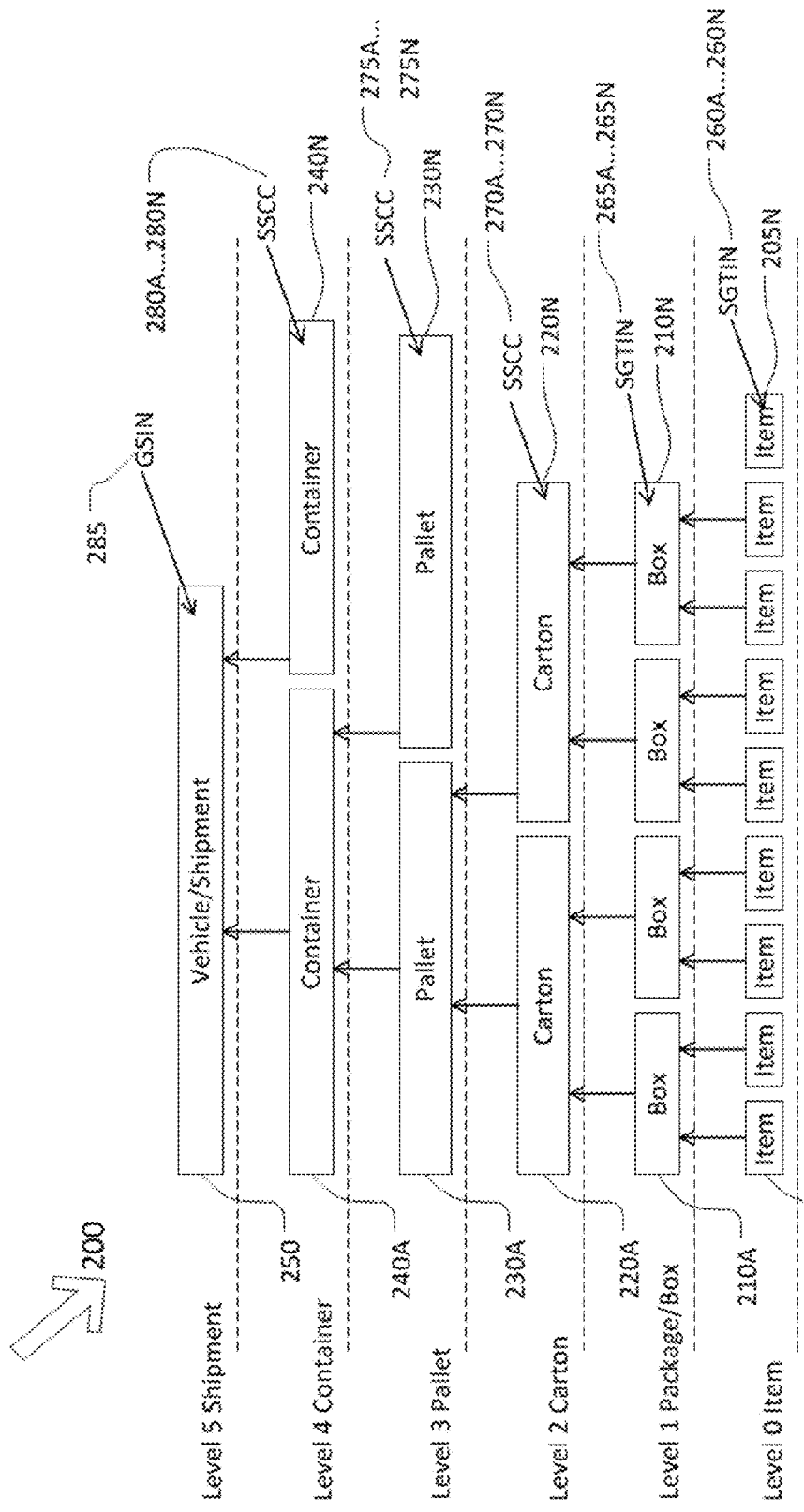
FIG. 2 is a diagram depicting a hierarchy of different articles to be moved along the supply chain of FIG. 1.

For many years, the brand owner 105 has relied on automatic identification technologies (auto ID), such as barcodes, human- and machine-readable tracking tickets, and RFID tags, etc., to facilitate tracking of products and logistical units along the supply chain. There are several logistical unit or packaging hierarchies that may be used in the supply chain. For example, GS1, a worldwide body that sets supply chain standards, defines a six-level packaging hierarchy 200, as shown in FIG. 2. The GS1 system standard includes several identification keys. The Global Trade Identification Number (GTIN) is used to uniquely identify goods (products/items or services) that may be priced, or ordered or invoiced at any point in the supply chain. The Serial Shipping Container Code (SSCC) is used to identify individual logistical units, such as any combination of products/items put together in a box, in a carton, on a pallet, in a container, or on a vehicle, such as a truck, a ship, etc. The Global Shipment Identification Number (GSIN) is a number assigned by a seller (sender) of the items to identify a logical grouping of physical units travelling under a dispatch advice. The GSIN fulfills the requirements of the Unique Consignment Reference (UCR) of the World Customs Organization (WCO) to identify shipments subject to import or export. The Global Identification Number for Consignment (GNC) identifies a logical grouping of items consigned to a freight forwarder and is intended to be transported as a whole. The GS1 system standard also includes a Global Location Number (GLN), a Global Returnable Asset Identifier (GRAI), a Global Individual Asset Identifier (GIAI), and a Global Document Type Identifier (GDTI), etc.

Thus, if the article needing tracking and tracing is a shipment, then the GSIN 285 will uniquely identify the article. If the article needing tracking and tracing is a logistical unit, then the SSCC 270A . . . 270N, or 275A . . . 275N, or 280A . . . 280N will identify the logistical unit. If the article needing tracking and tracing is a product/trade item, or a consumer unit of the item, then a Serialized Global Trade Item Number (SGTIN) will be used for identification. The identification data can be both private and public information, and can be master or transactional data. Master data is relatively constant over time, and transactional data is created during the physical flow of the articles, and is collected as events occur.

In the exemplary packaging hierarchy 200 of FIG. 2, Level 0 is at the item or product level, e.g., an item 205A . . . 205N bought by a consumer and identified by the SGTIN 260A . . . 260N. In general, the items do not have a serial number, but just the GTIN that signifies the brand owner number and the product type. In the embodiment of the present invention, every tradable item 205A . . . 205N has a serial number associated with the GTIN. Level 1 is at the package or box level, e.g., a plurality of the items 205A . . . 205N are packed in packages/boxes 210A . . . 210N. Each box/package will have its own SGTIN 265A . . . 265N, if the boxes/packages travel and are traded individually, or may have an SSCC if they travel collectively. If Level 2 is at the carton level, e.g., a plurality of the packages/boxes are put into cartons 220A . . . 220N, and each carton is identified by the SSCC 270A . . . 270N. Level 3 is at the pallet level, e.g., a plurality of the cartons 220A . . . 220N are loaded onto pallets 230A . . . 230N, and each pallet is identified by the SSCC 275A . . . 275N. Level 4 is at the container level, e.g., a plurality of the pallets 230A . . . 230N are placed in containers 240A . . . 240N, and each container is identified by the SSCC 280A . . . 280N. Level 5 is at the shipment level, e.g., a plurality of the containers 240A . . . 240N are loaded in a shipment or vehicle 250, e.g., a truck, a ship, a train, and each shipment/vehicle 250 is identified by the GSIN 285. This invention is not intended to be limited only to the packaging hierarchy 200 of FIG. 2, because those skilled in the art will recognize that other packaging hierarchies or other identification methods may be employed.

Figure 3:
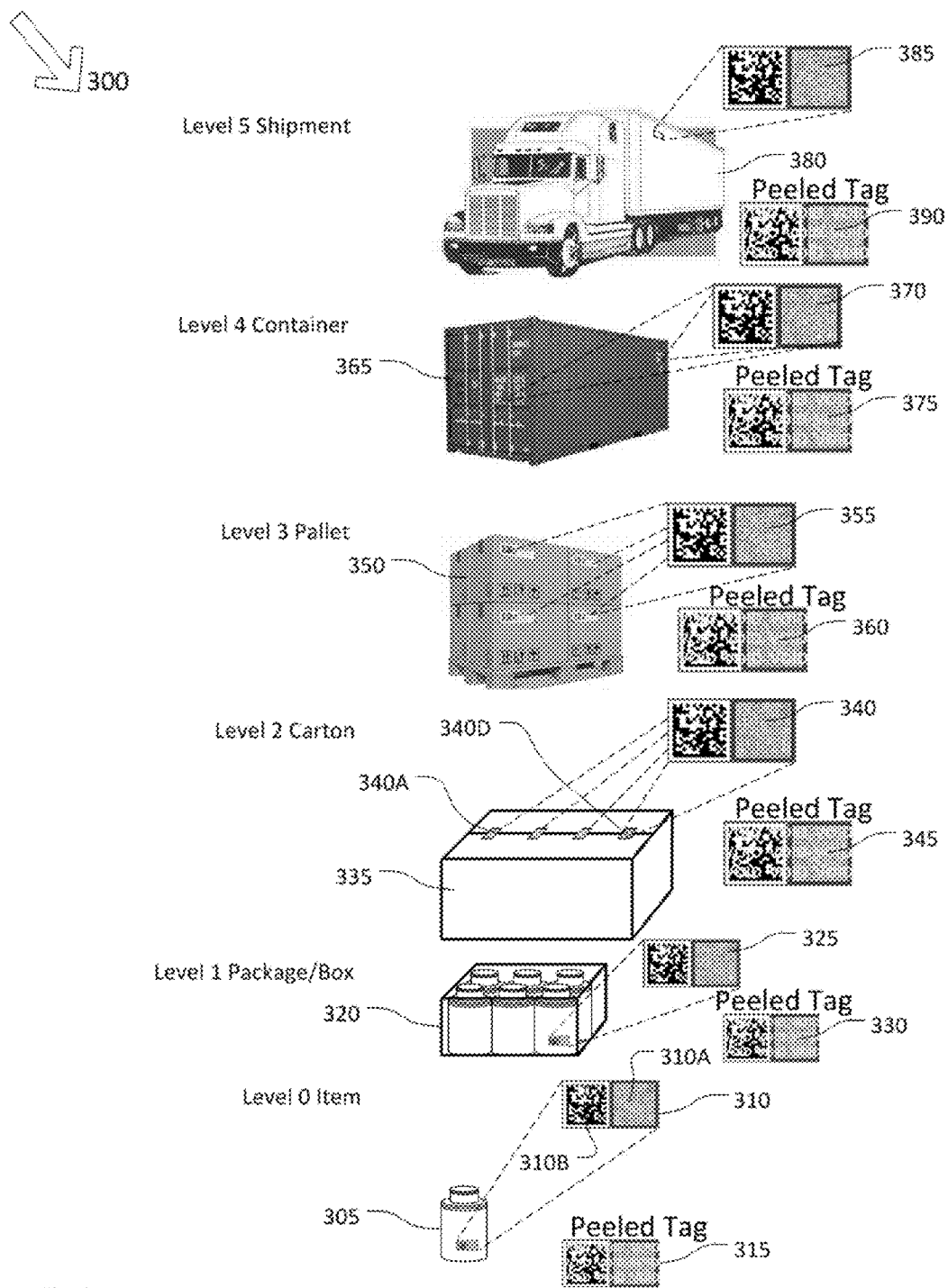
FIG. 3 is a part-pictorial diagram depicting tags applied to the hierarchy of different articles to be moved along the supply chain of FIG. 1.

FIG. 3 is a representation 300 of the six-level hierarchy 200 of FIG. 2, but with a representative item 305, box 320, carton 335, pallet 350, container 365, and vehicle/shipment 380 shown in pictorial form, and each bearing, or associated with, a tag/label 310, 325, 340, 370, 385, as described in detail below. As shown for representative tag 310, the label includes a first dataset 310A configured as a random distribution of three-dimensional elements on the tag, and a second dataset 310B configured as data elements on the tag. Advantageously, the three-dimensional elements are configured as a plurality of light-modifying particles and/or bubbles and/or depressions that are each sized between 50 microns and 3 millimeters, and that can have any shape, color, material, interior structure (hollow or solid), or size. Such three-dimensional elements are large enough to be distinguishable as three-dimensional particles for subsequent image processing and analysis. The three-dimensional elements are either applied to the tag on the article, e.g., by being ink jet-printed on the tag, or by being applied in a curable medium on the tag, or by being adhered to the tag, or by being applied or adhered directly to the article, or by being applied or adhered directly to a card remote from the article. The light-modifying particles may be either optically absorptive, reflective or retro-reflective, or any other property, e.g., fluorescence, that allows image capture. The particles can be of any organic or inorganic material, and can be uncoated or coated with another material to modify incident light, for example, by absorbing, reflecting or scattering the incident light. The data elements of the second dataset 310B are preferably also affixed to the tag, either adjacent to, or superimposed on, the first dataset 310A. The data elements are machine-readable, for example, they can be light-reflective or light-absorptive. Advantageously, the second dataset 310B is a barcode symbol printed on the tag, but could also be a serial number of alphanumeric characters, or an RFID tag.

Figure 17:
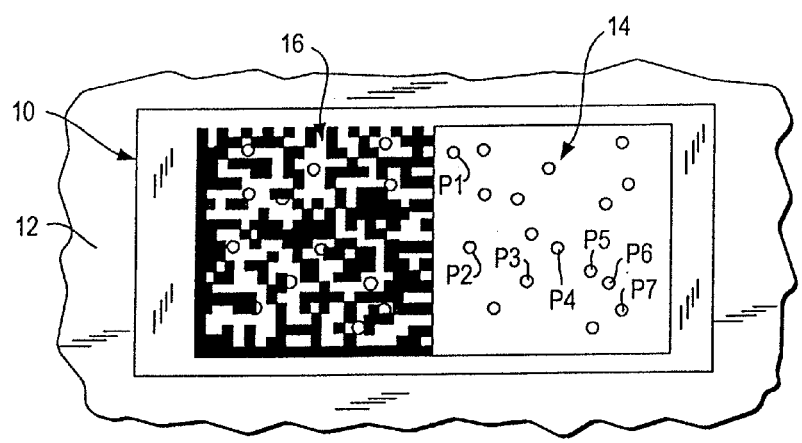
FIG. 17 is a top plan view of a label for authenticating an article.
Figure 18:
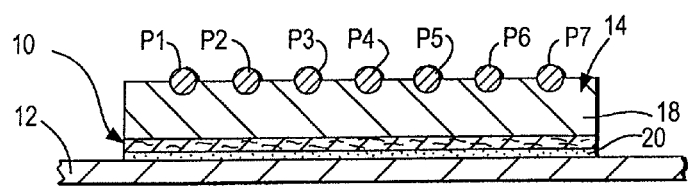
FIG. 18 is a part-sectional, enlarged, side view of the label on the article of FIG. 17.

FIGS. 17 and 18 depict a label 10, analogous to representative tag 310, affixed by an adhesive 20 to an article 12 to be authenticated. The label 10 bears product identification information 16, and authentication information 14 configured as a random distribution of raised, three-dimensional elements P1, P2, P3, P4, P5, P6 and P7 on a substrate 18. Authentication is based on verifying the elevation of the raised elements.

An interrogation device is preferably targeted at the first and second datasets 310A, 310B. When the interrogation device is configured as an image capture device, then modified (e.g., absorptive, reflective, or retroreflective) light is captured from the three-dimensional elements and the data elements. The modified light from the datasets can be captured simultaneously or consecutively. The image capture device may be a portable, handheld, mobile electronic device having a solid-state imaging module of the type conventionally found in consumer electronic digital cameras or bar code scanners, in which case, the mobile electronic device is typically a cellular telephone or smartphone that has a built-in imaging module, but can also be a personal digital assistant (PDA), a tablet, a computer, an e-reader, a media player, or like electronic device having a built-in imaging module, especially one that is normally readily at hand to the average user. The user then captures the modified light from the three-dimensional elements and the data elements by simply taking a picture of the three-dimensional elements and the data elements. The image capture device may also be a fixed scanning workstation, in which case, the first and second datasets 310A, 310B are either presented to the scanning workstation, or conveyed past the scanning workstation. The scanning workstation automatically captures the modified light from the three-dimensional elements and the data elements during their presentation or conveyance.

In accordance with one feature of this invention, an authentication pattern signature based on the random distribution of the three-dimensional elements is created for each article, and the modified light captured by the image capture device from the three-dimensional elements is processed as an image. The device verifies from the image that the elements are indeed three-dimensional, processes the image to generate an image pattern, compares the image pattern with the authentication pattern signature, and indicates that the article is authorized when the image pattern matches the authentication pattern signature. This can, for example, be performed by a three-dimensional camera as now available in mobile devices, thereby capturing and processing three-dimensional images in an easy, fast and accurate manner.

In one embodiment, the authentication pattern signature for the article is remotely stored in an addressable database remotely from the article. The database stores a multitude of other authentication pattern signatures for other articles. When read, the second dataset serves as an address identifier that identifies an address for the authentication pattern signature in the remote database, thereby enabling the database to be interrogated only at that address, rather than having to interrogate every authentication pattern signature in the database. This greatly accelerates article authentication and improves field performance. In another embodiment, the authentication pattern signature for the article, or at least part of the authentication pattern signature, is locally stored on the article, preferably as part, or the entirety, of the second dataset on the tag. Advantageously, the second dataset is a two-dimensional barcode symbol printed on the tag. When the second dataset is read by the same device that read the first dataset, the image pattern is quickly compared with the locally stored part of the authentication pattern signature, thereby even further accelerating article authentication performance.

Further details of an exemplary tag, system and method of authenticating articles in situ are disclosed in U.S. patent application Ser. No. 13/269,726, filed Oct. 10, 2011, the entire contents of which are hereby incorporated herein by reference thereto.

Other authentication pattern signatures may also be employed, such as physically unclonable functions (PUF) that exploit the physical properties of disordered structures, i.e., microstructures characterized by an explicitly-introduced randomness or an intrinsic randomness. These signatures use a challenge-response mechanism. When a physical stimulus is applied to the microstructure (called a challenge), the stimulus interacts with the microstructure of the object and provides a response. Since the microstructure depends on the physical factors introduced in manufacturing and is unpredictable, each challenge-response behavior is different and unpredictable, and this property may be used for authentication. These authentication pattern signatures are also within the scope of the present invention.

Thus, the interrogation device need not be an image capture device as described above, but could, in general, be any interrogation device, that reads a unique authentication pattern signature and may be based on optical principles as described above, but could be based on electrical, magnetic, electromagnetic, electro-optic, or magneto-optic principles, etc. Also, visible light need not be used, because ultraviolet and infrared light could also be employed. Characteristics other than reflection, absorption and scattering, such as fluorescence, could also be employed.

All articles in the supply chain must carry identification information and authentication information and must be labeled, marked or tagged at the source (or at their creation). The brand owner 105 must ensure that the identification and authentication information is provided on all articles, including those produced by licensee and contract manufacturers. The identification and authentication information must remain on the articles until they are consumed, destroyed, or modified. In accordance with this invention, at each point in the supply chain, the articles can be identified and authenticated by using an image capture device or like interrogation device depending upon the properties of the authentication pattern.

As mentioned above, no two articles can have the same exact authentication pattern image. This can be easily understood by an example. Assume that the three-dimensional elements are spherical and each of 0.9 mm size, and assume that the tag 310 has a size of 10 mm×10 mm. There are more than 100 (121 to be exact) possible positions where these elements can end up on the tag. These elements will be randomly distributed on the tag, and the possibilities of random distribution are limitless. For example, if 25 elements are put on the tag, then the combinations of how these elements will be occupying positions on the tag will exceed $2.4 \times 10^{23}$. Since the number of elements every time will be different, cumulative possibilities of random distributions of elements will far exceed $10^{30}$ for a tag of 10 mm×10 mm and for element sizes of 0.9 mm. For an element size of 0.5 mm, the possible combinations will exceed $10^{60}$. Thus, depending upon the size of the tag and the element sizes, the possible combinations of unique three-dimensional element distributions are almost limitless, and therefore no two image patterns are ever going to be the same. It is almost impossible for any company including the one who created the first tag to be able to recreate an identical tag. Thus, every tag affixed to an article will be unique.

If an unscrupulous party tried to remove any of the tags 310, 325, 340, 355, 370, 385 to affix them to different articles, then, if the tag is made of a special paper, then a void mark will be left on each such tag, and it will also destroy the three-dimensional structure of each tag, as shown by peeled tags 315, 330, 345, 360, 375, 390 in FIG. 3. If each peeled tag is deployed on another article, then the void mark will show in the image capture device in the field showing that the article has been compromised. Also, since most image capture devices (such as a cell phone, or CCD-based auto ID scanners, or RFID readers) also have global positioning satellite (GPS) chips incorporated into them, the brand owner 105 can also know where and when the supply chain was compromised.

Figure 4:
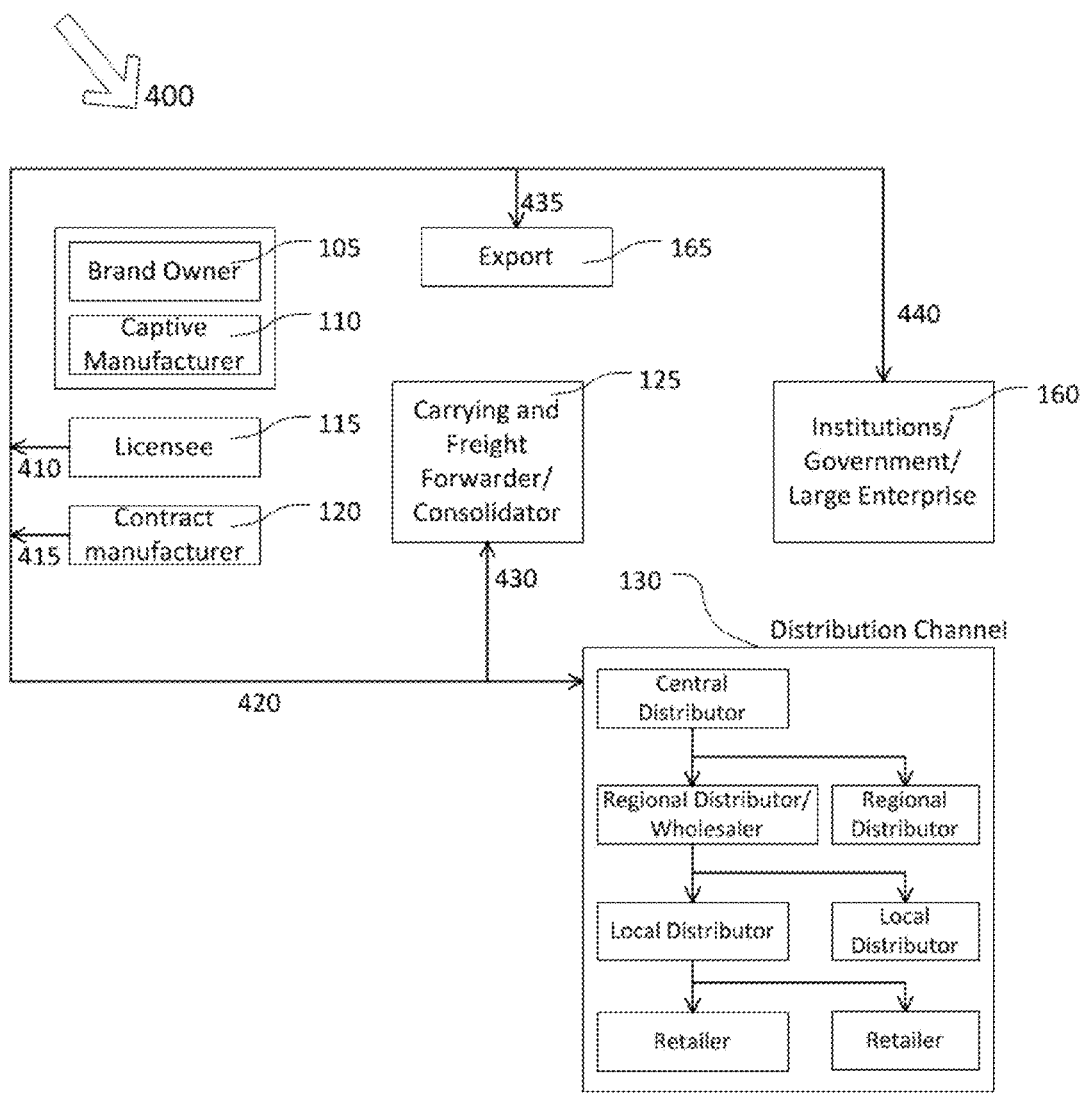
FIG. 4 is a block diagram depicting product overruns entering the supply chain of FIG. 1.

FIG. 4 is a block diagram 400 that depicts how product overruns from any manufacturing entity 110, 115, 120 that the brand owner 105 may have contracted with, flow into the supply chain. The captive manufacturer 110 may have limited manufacturing capacity and capability, and to supplement and complement its capabilities, the brand owner 105 may try to leverage the capabilities of licensee manufacturers 115 and contract manufacturers 120. However, the brand owner then has limited controls over these outside manufacturers. The outside contract/licensee manufacturers may produce authorized products for the brand owner 105 and may also produce almost identical products, known as product overruns, for the unauthorized counterfeit market as shown by the arrows 410 and 415. The brand owner 105, or any investigating agency or law enforcement entity, typically cannot differentiate between the branded products and the product overruns. The product overruns may bear the brand mark, but the brand owner is deprived of its rightful revenue and profit. Identification information encoded in barcodes, RFID chips, alphanumeric numbers or other means, can be copied by the outside contract/licensee manufacturers, who then may place these product overruns into packages, boxes, cartons, pallets, containers, and shipments, etc., and may infiltrate the supply chain under the brand owner's name as shown by arrow 420, or ship them to the freight consolidator 125 as shown by arrow 430, or to institutional users 160 as shown by arrow 440, or to exporters 165 as shown by arrow 435. The contract/licensee manufacturers may also infiltrate the supply chain at other points in the distribution channel 130, e.g., the central distributor, the regional or local distributors, or the retailers. Some of the intermediate entities in the supply chain may be accomplices in an unauthorized distribution chain.

Such product overruns can be prevented by giving the outside contract/licensee manufacturers a fixed number of the tags 310. As described above, each tag comprises not only the identification information (e.g., the SGTIN number), but also the unique authentication information, which cannot be duplicated by the outside manufacturer, or even by the tag creator. Any product overruns, therefore, cannot have a brand tag and will be caught in the supply chain, e.g., in the distribution channel 130, at a retailer, or even by the end customer by either manually or automatically using an image capture device or like interrogation device connected to a network, or through local authentication, as described above.

Thus, the tags 310 are created with the authentication information and the identification information thereon, and the manufacturer will cause such tags 310 to be affixed on, or associated with, the products. Typically at the point of manufacture or shipping, the authentication information and the identification information are captured and stored in a brand owner's controlled database. This step of capturing and storing said information in the brand owner's database is termed herein as "activation". Only when a product is so activated, does it become a "branded" product. The manufacturer may also assemble the product (level 0 item) into various logistical units, e.g., a level 1 logistical unit (e.g., a box/package), or a level 2 logistical unit (e.g., a carton), etc., as described in FIGS. 2-3, in which case, a respective tag is affixed on, or associated with, a respective logistical unit. These logistical units are "activated", as described above, by capturing and storing said information on the logistical unit's tag in the brand owner's database, whereupon the "branded" logistical unit may then be monitored in the supply chain.

Alternatively, all products manufactured by outside manufacturers may be collected at a central location under the control of the brand owner, and then packaged under the brand owner's control into various logistical units. Any product from the manufacturer that does not have an activated tag can be discarded at this central location, and the manufacturer who sent that product can be identified for appropriate action by the brand owner. There are various alternatives in securing the supply chain at one or more locations to prevent product overruns at their source.

Figure 5:
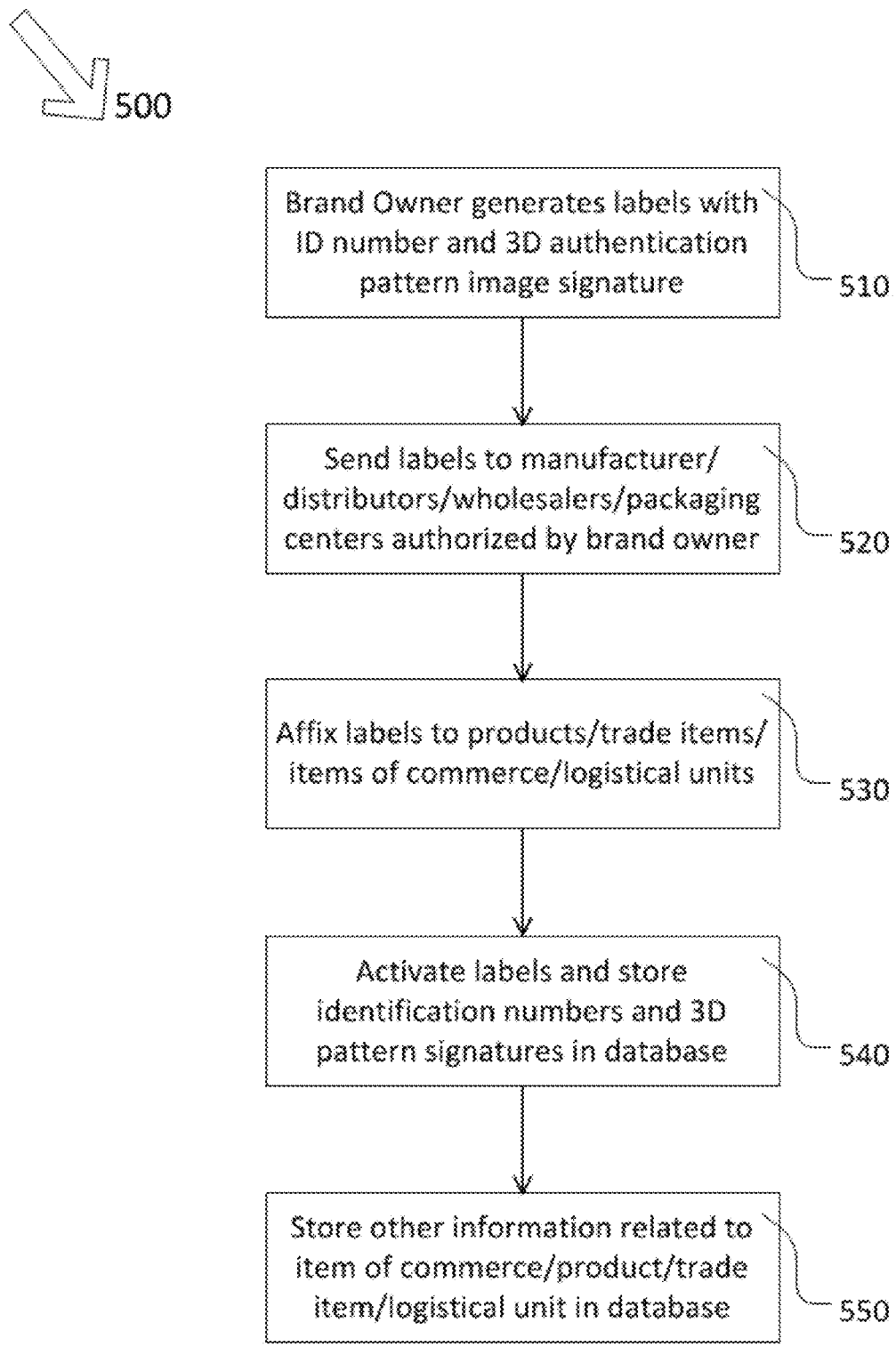
FIG. 5 is a flow chart depicting a method of securing the supply chain of FIG. 1 in accordance with this invention.

FIG. 5 shows a flow chart 500 that describes how the articles can be secured at the source of production and packaging. The brand owner 105 assumes the responsibility to have unique tags/labels 310 created with serialized global trade identification numbers and three-dimensional authentication image pattern signatures in step 510 under strict control. These labels can be sent to appropriate supply chain locations for affixing to the articles in step 520. In step 530, the labels are affixed to the articles. The labels 310 are then activated, as described above, i.e., the identification (ID) numbers and the authentication pattern signature are created and stored in a remote database in step 540. Any additional information about the articles can also be stored in the database in step 550. This additional information may include country of origin, creation date of the label, customer/retailer identification information, purchase order number, SKU number, geographical information where the article is to be sold, invoice number, item size, weight, photographs, quality control information, metadata, videos, manufacturing date, distribution chain routing, shipping codes, return article information, or any other information relevant to the article or to the supply chain as described in GS1 or other standards.

Figure 6:
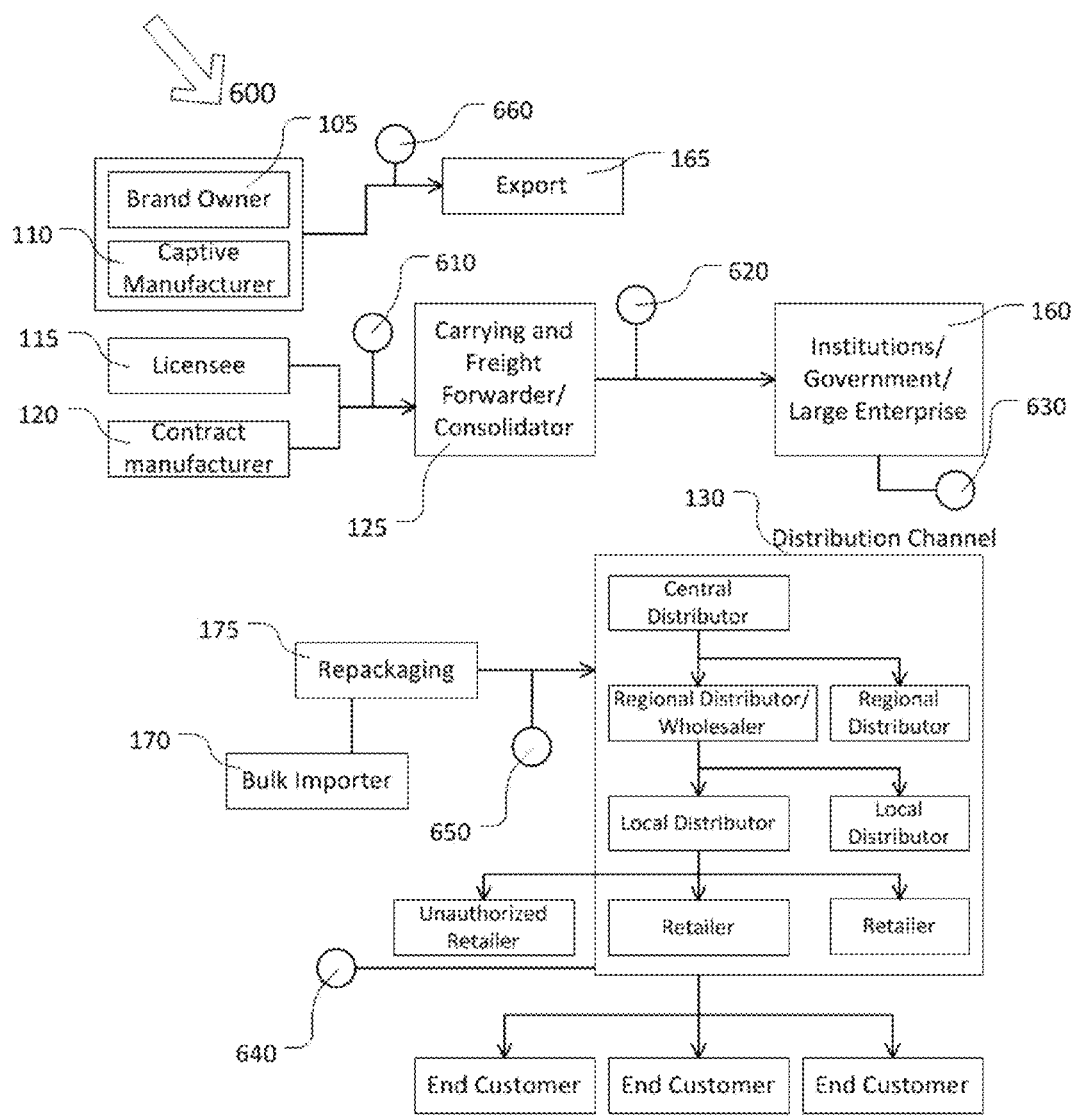
FIG. 6 is a block diagram depicting article diversions from the supply chain of FIG. 1.

FIG. 6 is a block diagram 600 that depicts some exit points from where unauthorized diversion of the articles can take place from the supply chain. The licensee/contract manufacturers are supposed to use authorized channels to send articles to the freight consolidator 125 for further transportation to various entities in the supply chain, such as the distribution channel 130 or to institutional users 160. The price that licensee/contract manufacturers get through the authorized channels may be lower than what they can command from other unauthorized/illegal channels. These articles, therefore, can be diverted to other illegal channels as shown at exit points 610. The articles that exit the supply chain at 610 may reenter the supply chain at other entry points in the chain, e.g., at regional or local distributors, retailers, exporters, or institutional users. The freight consolidator 125 is expected to send articles to institutional users 160, but they can exit or be diverted as at point 620, because the freight consolidator 125 may get a higher price if the articles can be sold to entities who are further downstream, such as retailers or local distributors. Thus, the articles exiting at point 620 may reenter the supply chain at some other points. Institutional users often negotiate special pricing arrangements with the brand owner, and some of their articles may leave the supply chain as at exit point 630, and reenter the supply chain at other entry points where the intermediate entities in the supply chain can reap a larger share of profit at the expense of the brand owner, or exported to countries where the price may be higher. Articles may also exit the supply chain from the distribution channel 130 at point 640, and reenter the supply chain at other locations. For example, if articles destined for a particular country where the price a brand owner was willing to accept was lower, then those articles might be sent/exported to another country where the price may be substantially higher, or only dummy articles may be exported and kept in the country where the prices may be higher.

Sometimes, the brand owner may import articles into a country, or an authorized bulk importer 170 may be allowed by the brand owner to import into a given country. These articles are meant to be repackaged at 175 into logistical units and distributed in the market through the authorized channels. However, these articles may be diverted before they reach the distribution channel 130 as shown at point 650 and may reenter at some other entry points in the supply chain. For example, they may be re-exported back into other countries where the prices may be higher than the importing country.

Articles may also be diverted or exited from the supply chain at other locations. The brand owner may have directed authorized manufacturing entities to export certain articles to other countries where the prices the brand owner may accept may be lower as in emerging or less developed nations. Rather than exporting these articles, they may be diverted as at point 660 and may, in fact, reenter the distribution channel 130 in the local market.

It should be clear to all those who are proficient in the art that these are not the only locations in the supply chain from where the articles may be diverted or exited. The diversion points shown in FIG. 6 are only for illustration and shown as examples. Unscrupulous parties continue to devise ingenious means to defeat the authorized channels that the brand owner counts on. The present invention makes it extremely difficult and almost impossible for unscrupulous parties to bypass or circumvent the authorized channels.

As described in FIG. 3, each article has a label with identification and authentication information. The brand owner 105 knows where the articles are supposed to be in the supply chain, and no unscrupulous party, dishonest dealer, or thief can duplicate the identical label due to the impossibility of recreating the three-dimensional authentication pattern. Therefore, article diversion can be detected as soon as they reenter the supply chain at locations not expected. Any honest dealer, distributor, field personnel, law enforcement agency, honest retailer, or any honest entity in the authorized supply chain will be able to detect any breach in the authorized supply chain by using any portable or fixed interrogation device, such as an image capture device, without any special skill sets. As the datasets are captured by the device, the captured identification number (ID) is checked to determine whether it is in the pre-established database, and then the captured authentication image pattern is checked to determine whether it matches the authentication pattern signature stored in the pre-established database, as well as whether the article being authenticated is at the right geographical location at the right time. If any of these conditions are not met, a red flag is raised, and a warning communication is reported to the brand owner/law enforcement agencies for action.

Figure 7:
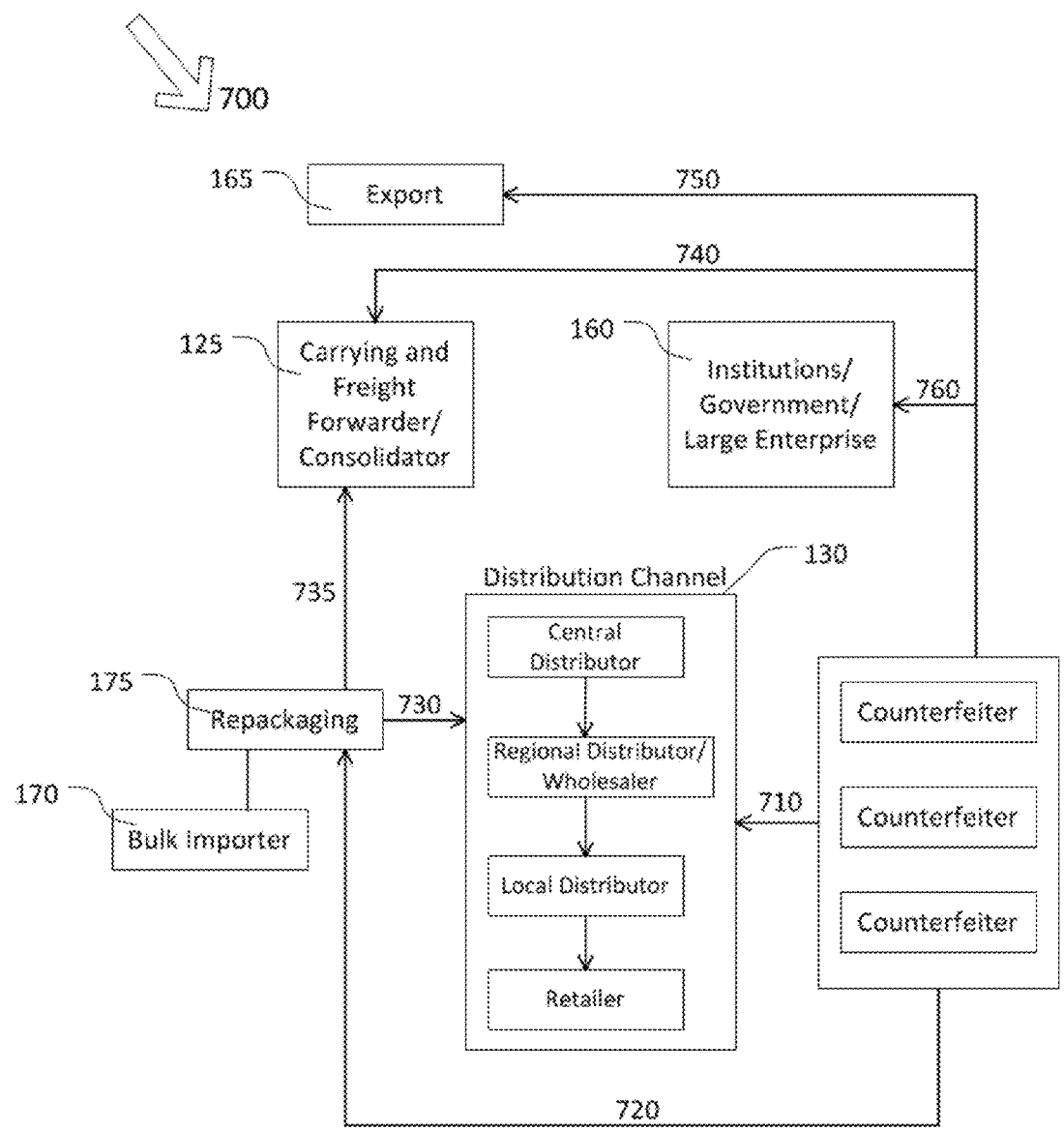
FIG. 7 is a block diagram depicting counterfeit articles entering the supply chain of FIG. 1.

FIG. 7 is a block diagram 700 that shows examples of some of the entry points where counterfeiters may push counterfeited articles into the supply chain. Counterfeiters produce, or have produced by other manufacturers, items, and assemble, or get assembled, the items into logistical units, and infiltrate the items/logistical units into the supply chain at multiple entry points. For example, counterfeiters may infiltrate items/logistical units into the distribution channel 130 at entry point 710. Counterfeiters may find dishonest central distributors, regional or local distributors, and retailers, and use these relationships to push counterfeit articles to the end customers. Counterfeiters may also enter the supply chain through repackaging entities 175 who repackage the imported articles in a given country as shown at point 720.

Once the items are put into logistical units by re-packagers, they can enter the distribution channel 130 as shown at point 730. Re-packagers 175 may also push counterfeited articles to the freight consolidator 125 as shown at point 735. Counterfeiters may also find a willing dishonest freight consolidator 125 who can push their articles to them directly as at point 740. Once the logistical units are handled by the freight consolidator 125, they can follow the normal route without any further suspicion from anyone. Counterfeiters may also push their articles directly to institutional users 160 as at point 760, or to exporters 165 as at point 750.

Figure 8:
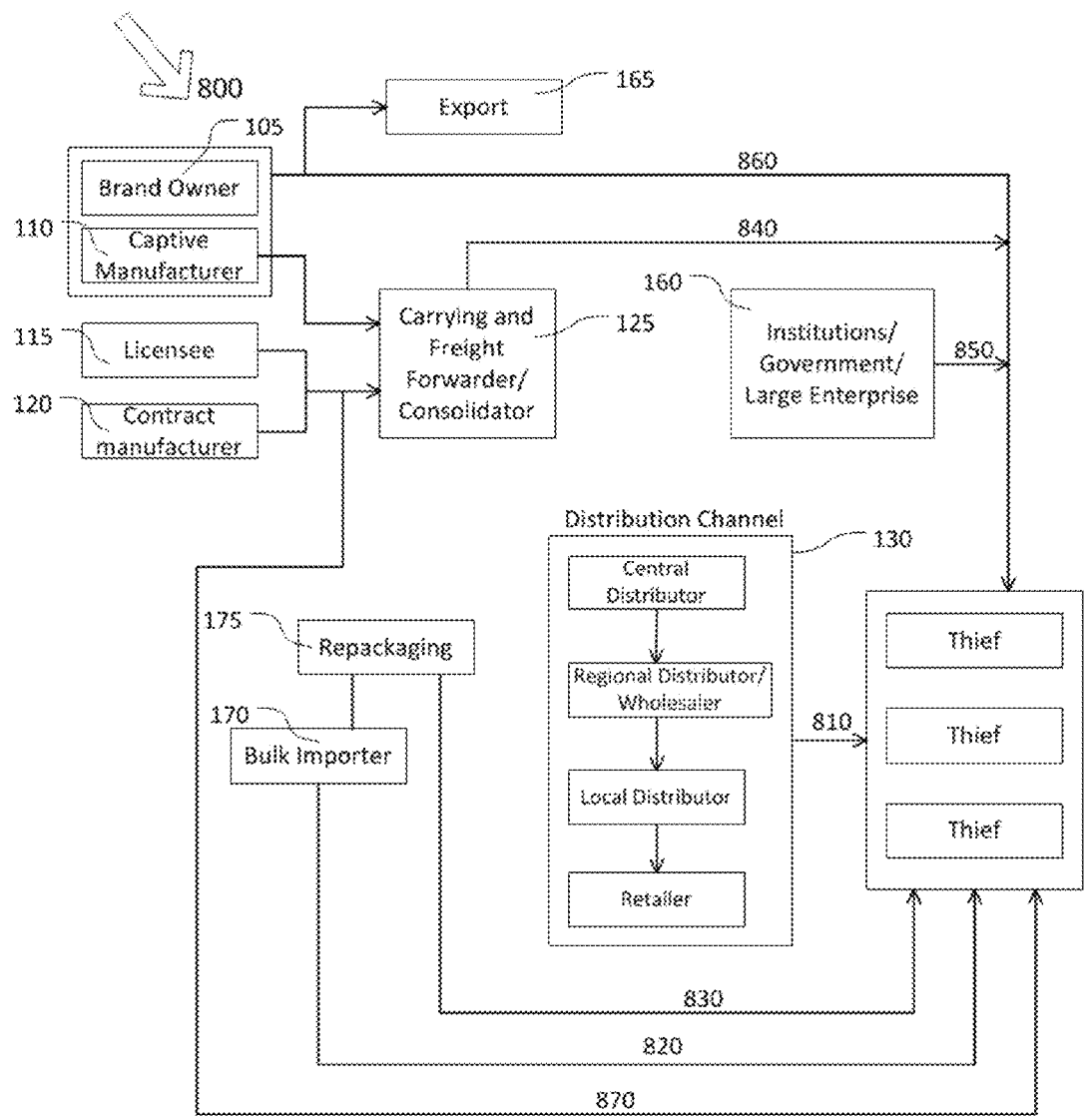
FIG. 8 is a block diagram depicting article theft from the supply chain of FIG. 1.

FIG. 8 is a block diagram 800 that shows stolen articles exiting the supply chain. For example, thieves can infiltrate the distribution channel 130 and steal the articles as shown at point 810. Articles can also be stolen from bulk importers 170 as shown at point 820, or from repackaging outfits 175 as shown at point 830. A significant amount of stealing takes place during transportation as the articles move from one location to another. Articles can be stolen from the freight consolidator 125 at point 840, or from institutional users 160 as shown at point 850, or from exporters 165 as shown at point 860, or during transport from the outside manufacturers to the freight consolidator 125 as shown at point 870. Once stolen articles gets into the hands of thieves, they may follow the same route to the end customers. The present invention prevents this by first identifying the articles, identifying where the articles are expected to be in the supply chain, and then authenticating the articles.

Figure 9:
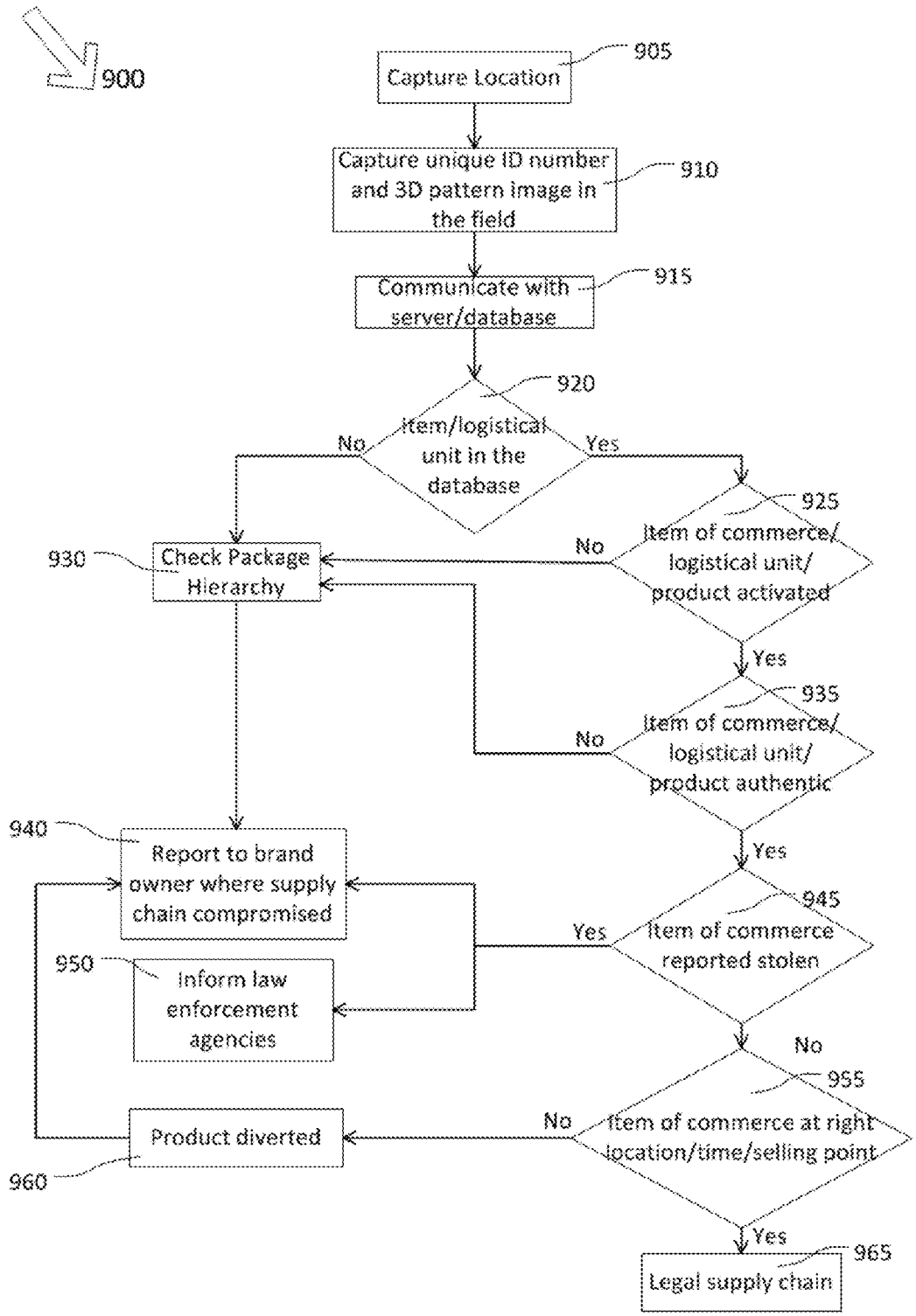
FIG. 9 is a flow chart depicting a method of securing the supply chain of FIG. 1 against diversion, product overruns, theft, and counterfeiting in accordance with this invention.

FIG. 9 is a flow chart 900 that describes how each article that has been diverted or stolen can be discovered at a plurality of points in the supply chain. The image capture device with built-in GPS automatically captures the location of the article at step 905. Alternatively, the location can be entered manually on the device at step 905. At step 910, the unique identification number (ID) of the label and the associated unique three-dimensional authentication image pattern are captured by the device. This captured information is communicated to a remote server and database in step 915. Each ID has the brand owner's number and the article type, as well as a unique serial number, and also the packaging hierarchy level as described in FIG. 3. In step 920, a check is made to see if the ID exists in the database. If the ID number is not in the database, then the packaging hierarchy is checked in step 930 and the information about the location where an attempt has been made to breach the security of the supply chain is communicated to the brand owner for action in step 940. If the article exists in the database, then the server checks that the article has been activated in step 925. The database may have two types of IDs: un-activated and activated. If an unscrupulous party has been able to obtain IDs from some source, or have been able to duplicate the IDs in step 925, then this activity will be discovered here. Un-activated labels may be initially provided to manufacturers, but the labels must be activated and applied to the articles for assuring the integrity of the supply chain. If the labels were not activated, then the packaging hierarchy level is checked in step 930, and a warning communication or report as to where the inactivated labels were discovered in the supply chain is communicated to the brand owner for action in step 940.

If the article was activated, then its authenticity is checked in step 935, as described above, by capturing the authentication image pattern, confirming that the image pattern is three-dimensional, and then checking the positions of the three-dimensional elements against an authentication signature stored in the database. If the label is not found to be authentic in step 935, then the packaging hierarchy is checked in step 930, and the information where the breach in the supply chain has taken place is communicated to the brand owner for action in step 940. If the ID was in the database and was activated, but the label was found to be unauthentic, it signifies that the ID has been faked by unscrupulous parties in the supply chain. If the article is found to be authentic, it is checked if the article was reported stolen anywhere in the world in step 945. If it had been reported stolen, then this information where the stolen article was discovered is communicated to the brand owner in step 940 and to law enforcement agencies in step 950.

If the article was not reported stolen, then it is checked to see if it is at the right location where it is expected to be, and at the right time, and at the right selling/receiving point, in the supply chain in step 955. If these requirements are not met, then the article may have been diverted as shown in step 960 from the supply chain, and this information about location, time and the logistical unit/item serial number is communicated to the brand owner in step 940. If the article is found to be at the right location, at the right time, and at the right selling point in step 955, then it is concluded that the supply chain is legal in step 965. All these operations are advantageously managed by computer programs stored and processed in various servers and databases with little intervention by human beings.

Figure 10:
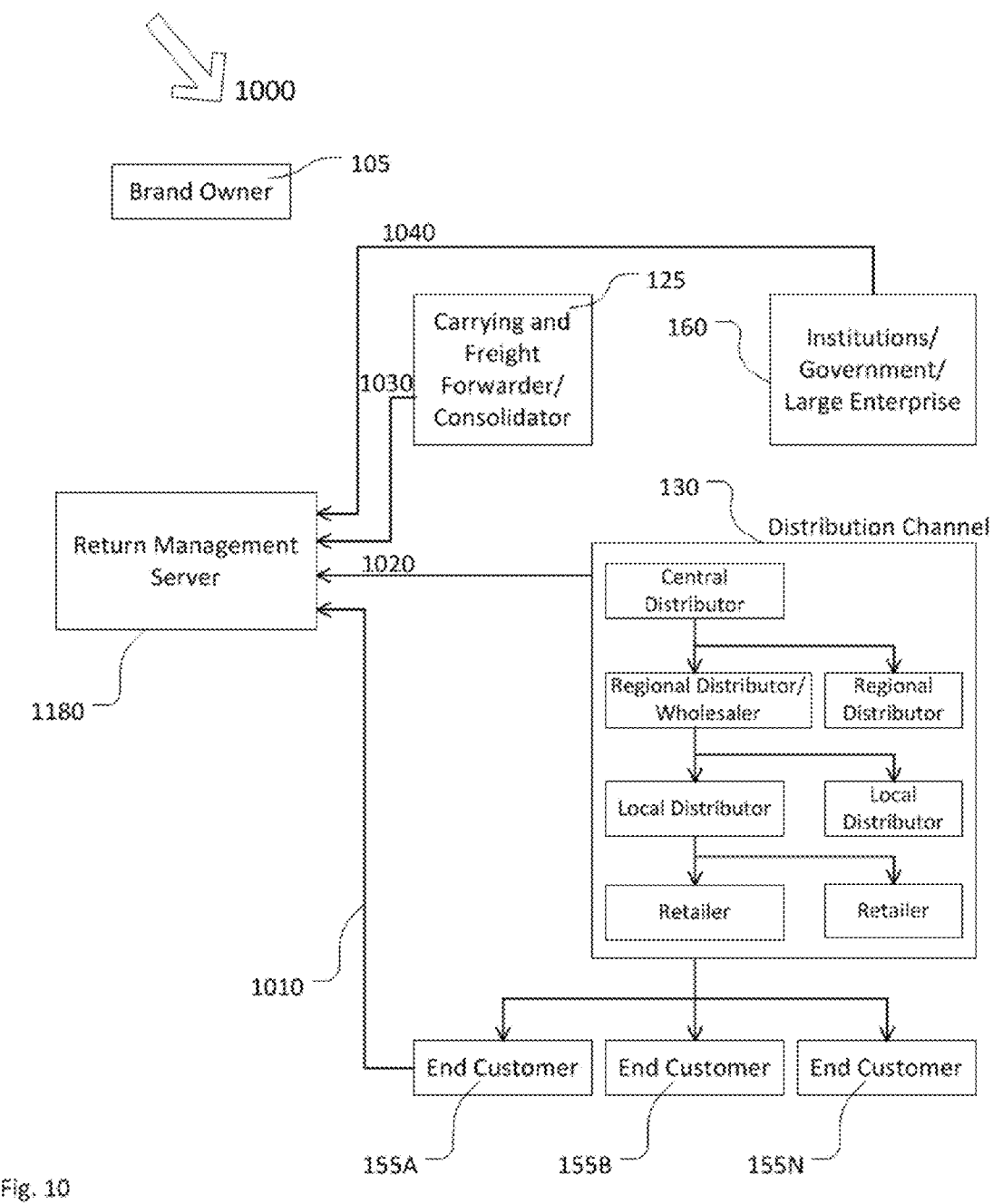
FIG. 10 is a block diagram of a reverse supply chain depicting article returns to the supply chain of FIG. 1.

In addition to breaches in the supply chain at various points as products move from manufacturers to retailers, and finally to end customers, the brand owner is also concerned about the reverse supply chain in which the products are returned in an opposite direction from customers, the distribution channel, institutional users, the freight consolidator, etc. back to the brand owner. FIG. 10 shows a block diagram of a reverse supply chain 1000. Products may be returned to the brand owner for various reasons. Products may be recalled if any major defect was discovered in the products in the field. Products may be returned for warranty and service related repairs. Retailers may have ordered too many products and may request a refund if all the products did not move to the end customer. Products may have expired (for example, drugs) and may have to be returned. Sometimes the products do not meet the expectations of the customers, and the company/brand owner may have a return policy allowing them to do that. Sometimes the products have to be recalled for destruction (drugs, for example). In all these and other cases not shown in FIG. 10 for brevity, the products follow the reverse supply chain to arrive back at the brand owner, or authorized facilities thereof, or authorized service centers, for proper credit to supply chain partners. All these authorized facilities are grouped together in return management server/facility 1180 (described in more detail in FIG. 14) and include, a product destruction facility, an expired product facility, a return product facility, a recall product facility, a service and warranty product repair facility, and a surplus product facility.

End customers may return products to the facility 1180 as shown by arrow 1010. Distribution channel partners may return products to the facility 1180 as shown by arrow 1020. The freight consolidator may return products to the facility 1180 as shown by arrow 1030. Institutional users may return products to the facility 1180 as shown by arrow 1040.

A problem in the reverse supply chain that the brand owner faces is that the products returned for credit may not have been authentic or authorized, and may have not belonged to the brand owner. However, the authorized facility 1180 has heretofore had no easy way to identify and authenticate the products, because the counterfeited products may have been produced by the same manufacturer who produced the brand owner's products (overruns), or by counterfeiters who have become extremely sophisticated. This invention provides a tool for the authorized facility 1180 to check the identity and authenticity of the returned products, thus avoiding unnecessary credit to undeserving parties. The authorized facility 1180 will also be able to keep a record of the statistics of fake products coming from different entities, and can look for and find a trend to locate unscrupulous parties in the supply chain.

Figure 11:
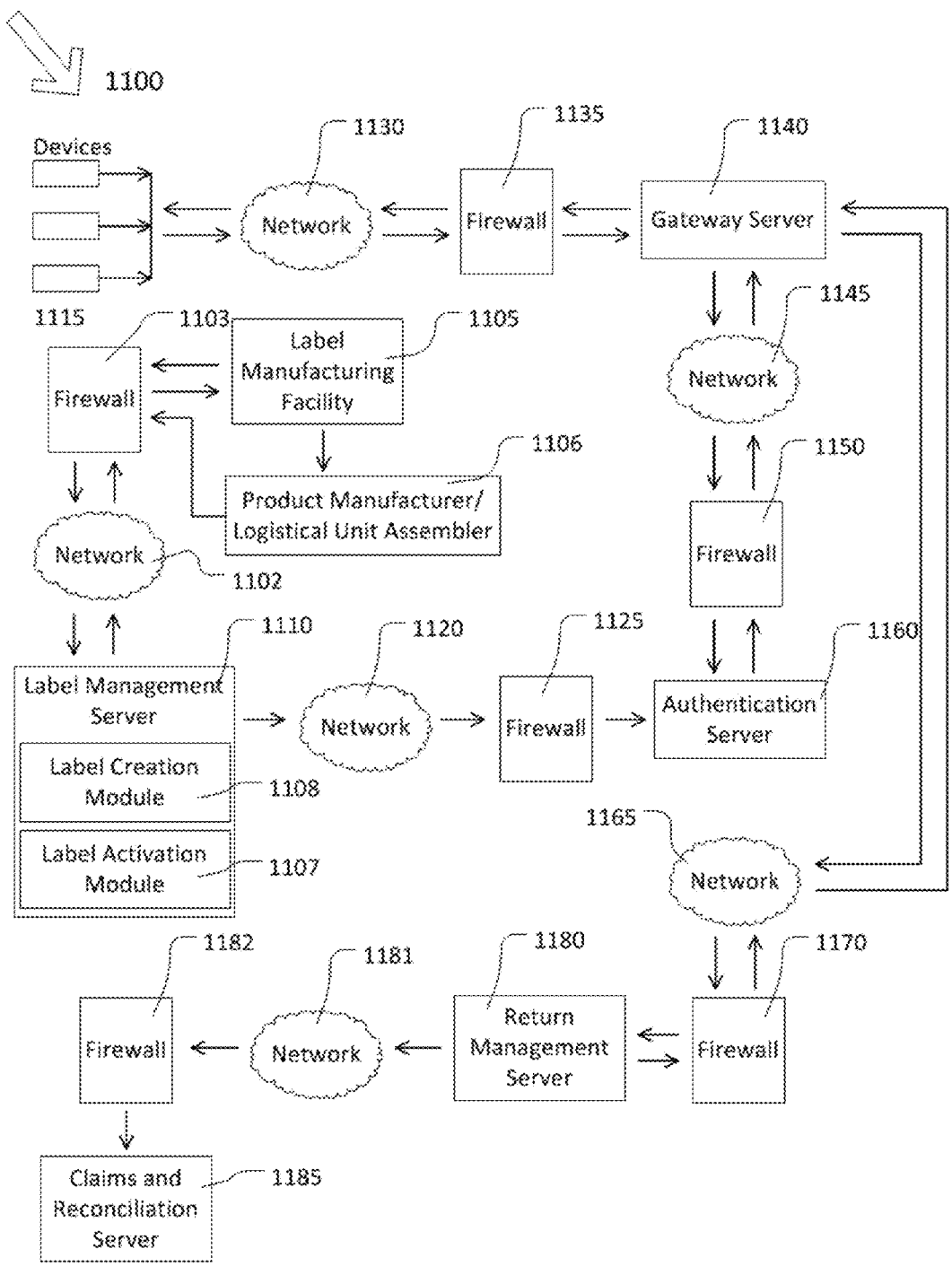
FIG. 11 is a block diagram depicting a system for securing the supply chain of FIG. 1 in accordance with this invention.

Reference numeral 1100 in FIG. 11 generally identifies elements of a system to secure the articles in the supply chain in accordance with this invention. System 1100 includes a Label Management Sever (LMS) 1110 that is in bidirectional communication with a label manufacturing facility 1105 via a network 1102 and a firewall 1103, one or more fixed or portable interrogation devices, such as the above-described image capture devices 1115, a gateway server 1140, an authentication server 1160, a Return Management Server (RMS) 1180 that is in communication with a Claims and Reconciliation Server (CRS) 1185 via a network 1181 and a firewall 1182 as shown. The LMS 1110 is in unidirectional communication with the authentication server 1160 via a network 1120 and a firewall 1125. Each image capture device 1115 is in bidirectional communication with the gateway server 1140 via a network 1130 and a firewall 1135. Each image capture device 1115 and a similar interrogation device 1406 (shown in FIG. 14) is capable of transmitting bidirectional data and/or video and/or text over a packet-based, or non-packet-based, communications network, in encrypted or unencrypted form, in real or delayed time. The gateway server 1140 is in bidirectional communication with the authentication server 1160 via a network 1145 and a firewall 1150. The gateway server 1140 is in bidirectional communication with the RMS 1180 via a network 1165 and a firewall 1170. Finally, the label manufacturing facility 1105 physically ships labels, such as representative labels 310, to product manufacturing/logistical unit assembling facility 1106. Facility 1106 is in unidirectional communication with the LMS 1110 through the network 1102 and the firewall 1103.

Although several servers and management systems have been illustrated in FIG. 11, this is not intended to be limiting, because this invention contemplates that a different number of servers could be deployed, or combined into fewer ones, or expanded into higher numbers, or could be all combined into a single system/server.

The LMS 1110 manages the creation and activation of the labels 310 and directs the label manufacturing facility 1105. After the brand owner 105 decides to have an article manufactured by a particular manufacturer (captive, licensee, or contract manufacturer), the brand owner directs the LMS 1110 to design article labels 310 that include an identification (ID) number comprising the brand owner number, article type, and the serial number, and three-dimensional authentication information. This design and numbering information is communicated to the label manufacturing facility 1105 for production of the labels. This process of label design and creation is managed by a label creation module 1108 in the LMS 1110. The label manufacturer ships these labels to the product manufacturers and logistical unit assemblers 1106 designated by the brand owner.

After the articles are manufactured by the manufacturers, these labels are affixed to the products if the labels were meant to be for products, or to the logistical units (in which the products are packed for transport) if the labels were meant for the logistical units. When the products are loaded at a manufacturer site for transport, the label information will be captured by one of the devices 1115 that captures both the identification and the authentication information and communicates the location and the instance when the articles left the premises of the manufacturer to the LMS 1110. Facility 1106 transfers this captured information to the LMS 1110. The label is deemed to have been activated at that moment, and this activation is managed by a label activation module 1107. The articles are then monitored through the supply chain by capturing the label information by one of the devices 1115 at any one of a plurality of points/locations in the supply chain.

The networks 1130, 1145, 1165, 1102, 1181 and 1120 may include any wired, wireless, or optical network capable of transferring data and may include a public switched telephone network, a local area network, an ad-hoc network mesh network, a free space optical network, an optical network, a wireless local area network, a Wi-Fi, Bluetooth, WiMax, or LTE network, etc., a metropolitan area network, wide area networks, such as 2G, 3G, 4G or higher, the Internet, etc., and can use any network protocol, e.g., Internet Protocol (IP), Asynchronous Transfer Mode (ATM) or Synchronous Optical Network (SONET), etc. The networks 1130, 1145, 1102, 1165, 1181 and 1120 may also include network devices, such as routers, switches, firewalls, gateways, communication interfaces, input devices, output devices, and buses to interconnect such server components as processors, microprocessors, random access memories (RAMs), dynamic storage devices, read only memories (ROMs), etc. Networks 1130, 1145, 1102 and 1165 may transfer data bidirectionally while networks 1120, and 1181 will be primarily transferring data unidirectionally. As is customary in the art, servers 1140, 1160, 1180, 1110 and 1185 utilize the firewalls 1135, 1150, 1170, 1125, 1103 and 1182 to assure that the security of the servers cannot be breached and, wherever appropriate, the data is encrypted as it moves between various servers to further secure the data transmission.

Figure 12:
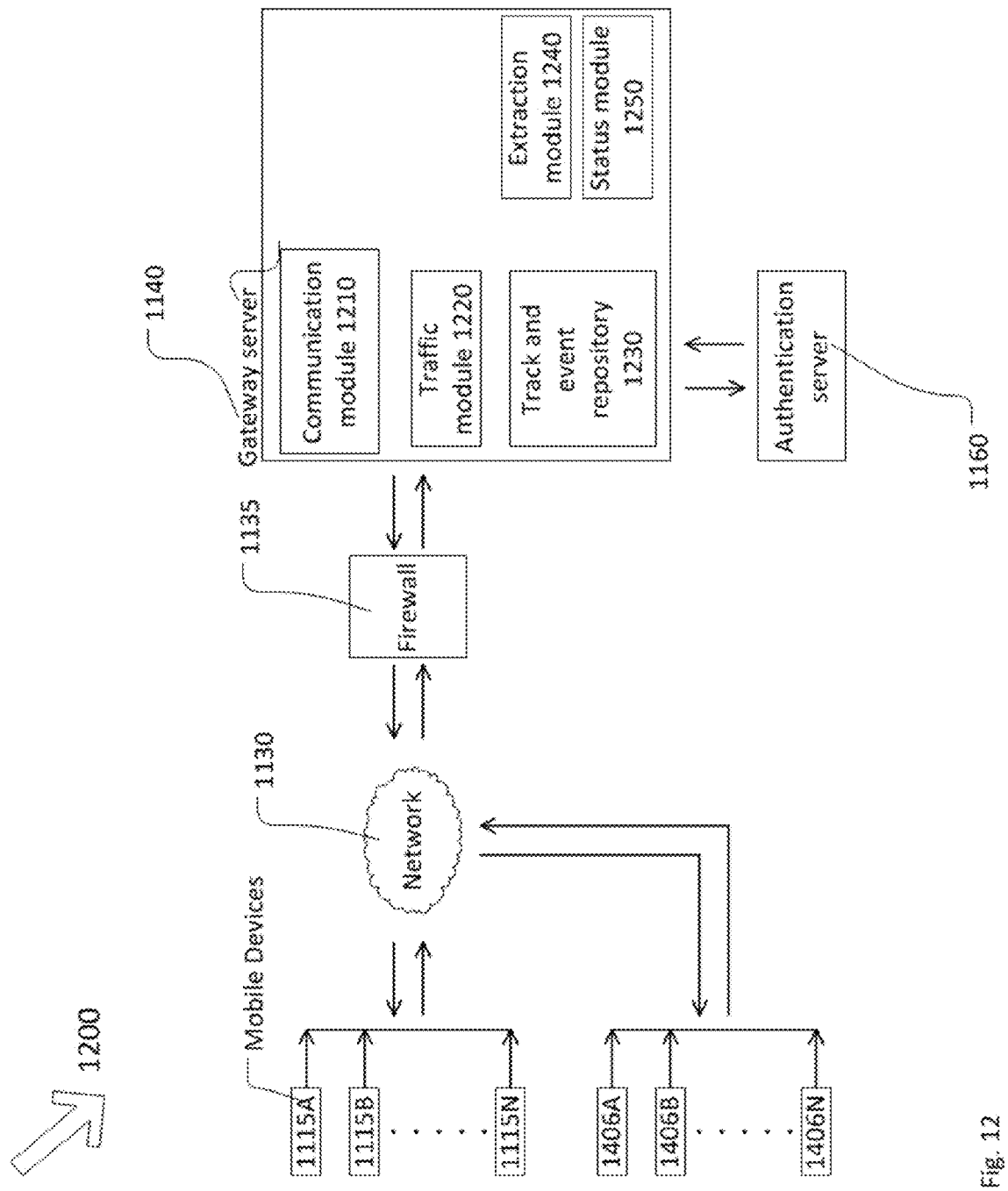
FIG. 12 is a block diagram depicting some components of the system of FIG. 11.

As best shown in the block diagram 1200 of FIG. 12, the gateway server 1140 includes hardware and software programmed to perform certain functions in response to software instructions contained in a computer readable medium. The gateway server 1140 interacts with multiple image capture devices 1115A, 1115B, . . . , 1115N and interrogation devices 1406A, . . . , 1406N as described in FIG. 14 and may run such applications as database applications, email applications, communication applications, and e-commerce applications.

The gateway server 1140 includes a communication module 1210 for receiving a request from each device 1115 or each interrogation device 1406A, 1406B, . . . , 1406N in the return management server 1180, and for sending information back to the respective devices 1115, 1406. The devices 1115, 1406 normally have an application preloaded from the gateway server 1140. The fetched application resides in the devices 1115 and 1406 and may be launched by actuating an icon displayed on the devices, or through a trigger on each device. At the same time, the communication module 1210 checks if the device 1115 and 1406 were previously registered in the system and, if not previously registered, the communication module 1210 seeks registration information, for example, the ID or the phone number of the device, or device ID number and user profile information, for example, the user's email address, demographics and the location etc. This information may be useful to track the location and also the person or machine which attempted to authenticate and track the article and the time such an attempt was made.

As noted above, the information captured by the device 1115 and 1406 include the captured authentication information and the captured identification (ID) information. An extraction module 1240 in the gateway server 1140 separates and distinguishes the authentication information from the identification information, e.g., the brand code, logistical unit/product code and the serial number. Extraction module 1240 also separates the packaging hierarchy. As discussed in FIG. 2, the articles in the supply chain can be an individual item (level 0), or various logistical units (levels 1, 2, 3, 4), or a shipment (level 5). The identification information encoded in the barcode, or RFID chip, or in an alphanumeric number system, includes alphanumeric characters to distinguish among the various levels of packaging hierarchy. Extraction module 1240 separates the hierarchy of the articles by knowing these alphanumeric characters.

The gateway server 1140 also includes a traffic module 1220 for directing the captured identification and authentication information to the authentication server 1160. Depending on the hierarchy of the articles as determined by the extraction module 1240, the traffic module 1220 directs the captured information to an appropriate authentication module in the authentication server 1160 for authentication of the article of commerce. For example, if the article of commerce being authenticated at a location in the supply chain as determined by the extraction module 1240 is a product, object, or an individual item, then the identification number and the authentication image pattern may be sent to an item level authentication server/module for authentication. If the article of commerce as determined by the extraction module 1240 is a logistical unit, then the identification number of the logistical unit and the authentication image pattern may be sent to a logistical unit authentication server/module for authentication. When the gateway server 1140 receives a request for authentication and tracking from a device 1115 or a device 1406, the gateway server 1140 sends the captured authentication information needed to authenticate the article to the authentication server 1160. Typically, the authentication information to be sent to the authentication server has two parts. One is an address identifier, e.g., a number encoded in the barcode or RFID chip or other addressing means, and the other is an authentication image pattern such as described above. The authentication server 1160 has a database 1330 (see FIG. 13) that has a pre-stored reference authentication information or signature that was affixed to, or was embedded into, each article and includes both an address and an associated reference image or signature.

While authentication is performed in the authentication server 1160, a status module 1250 in the gateway server 1140 sends the status of the authentication to the device 1115 or device 1406 through the communication module 1210. Also included in the gateway server 1140 is a track and event repository module 1230, which tracks and keeps the progression of each article as it leaves the source point until it arrives at the destination point. The number of times a given article of commerce was authenticated and the locations and times where and when the article of commerce was requested to be authenticated can be tracked, and all these events can be kept in module 1230. Keeping track of the locations and times as each article of commerce is moved through plurality of points in the supply chain is important, because if the locations and times followed a track not expected logically from the path of the article of commerce, that will signify a breach in the supply chain.

Figure 13:
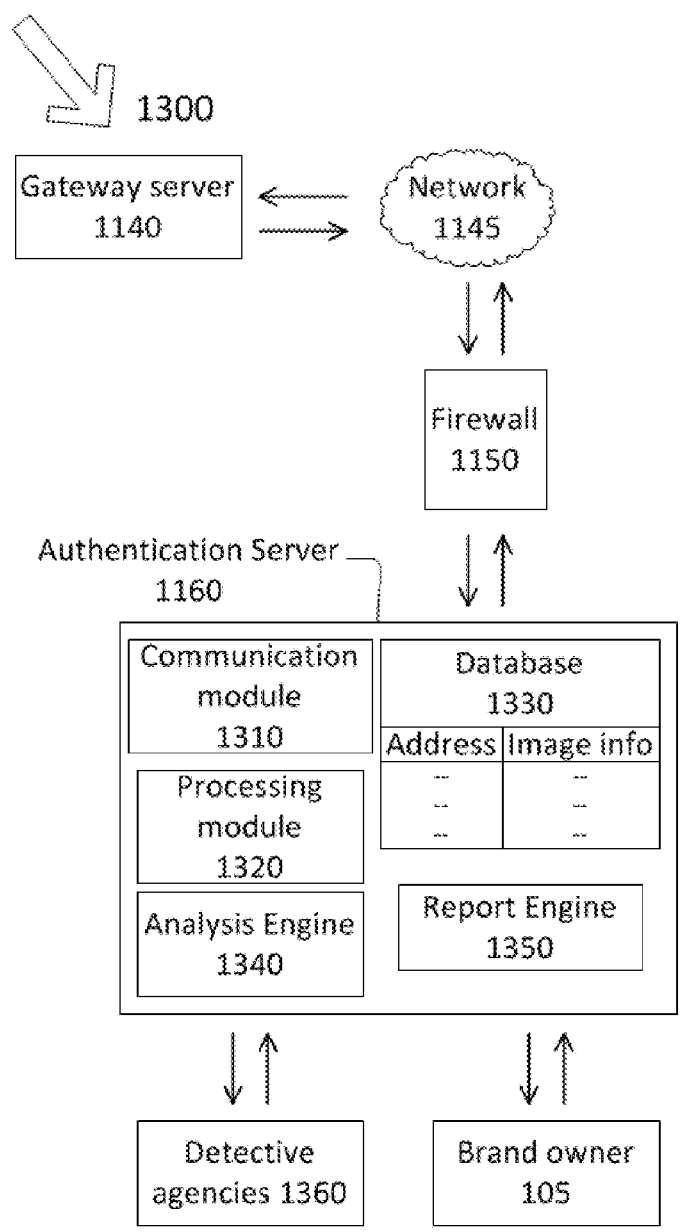
FIG. 13 is a block diagram depicting additional components of the system of FIG. 11.

As best shown in the block diagram 1300 of FIG. 13, the authentication server 1160 includes hardware and software programmed to perform certain functions in response to software instructions contained in a computer readable medium. The authentication server 1160 includes a communication module 1310, a processing module 1320, the aforementioned database 1330, an analysis engine 1340, and a report engine 1350. The authentication server hardware may include communication interfaces, input devices, output devices, and buses to interconnect the components of the authentication server, such as processors, microprocessors, RAMs, dynamic storage devices, ROMs, and other storage devices.

The communication module 1310 sends and receives information to/from the gateway server 1140. The received information from the gateway server 1140 may contain an address location in the database 1330 and pattern image information associated with that address location. The processing module 1320 processes instructions related to the operation of the authentication server 1160, and retrieves the stored signature or reference image information in the database 1330 at the address identified by the captured information from the gateway server 1140, and compares the stored reference image information in the database 1330 with the captured authentication information received from the gateway server 1140. If captured authentication information from gateway server 1140 matches all attributes of the stored reference image corresponding to the address location, then the processing module 1320 sends an output to the device 1115 or device 1406 via the gateway server 1140 with a message such as "item/logistical unit authentic", or a similar message. If the request for authentication came from the return management server 1180, then the authentication server 1160 will send an output to the return management server 1180 through the device 1406, either confirming or denying the authenticity of the item/logistical unit. If there is no match, then the processing module 1320 sends an output to the servers 1140 and 1180 with a message such as "unable to authenticate, try again", or "counterfeit", or a similar message.

The analysis engine 1340 analyzes the item types/logistical units of the brand owner to determine which items/logistical units are being counterfeited/diverted/overrun/stolen most, and in which geographic locations, based on the location of the device 1115, 1406 and the demographic information of the device 1115, 1406. The analysis engine 1340 collects such information as which items/logistical units were authentic and which were not, and which locations had the problems if any. The analysis engine 1340 also conducts data mining based on hardware or software logic, and as requested by the brand owner.

The report engine 1350 creates reports for each brand owner in the format specified by the brand owner based on the analysis by the analysis engine and communicates these reports through the communication module 1310 to the gateway server 1140 and finally to the brand owner 105.

The authentication server 1160 also communicates with law enforcement and detective agencies 1360, which may be deployed by the brand owner to identify breaches in the supply chain. However, the detective agencies have heretofore had no tools to track and authenticate an article of commerce's movement along the supply chain. Detective agencies in the past could have taken a sample article at various points in the supply chain and conducted an offsite investigation. However, this type of investigation is not in real time and is of limited value to secure the supply chain.

In this disclosure, every individual or machine that tracks an article of commerce's movement becomes a quality inspector, and whenever a departure from the expected norm is detected in space and time, and whenever the article of commerce is not authentic, this information is communicated to the brand owner and also to the detective agencies 1360 for action. Alternatively, statistical control charts and other analytical instruments can be created at those locations where instances of breaches in the supply chain are numerous.

Figure 14:
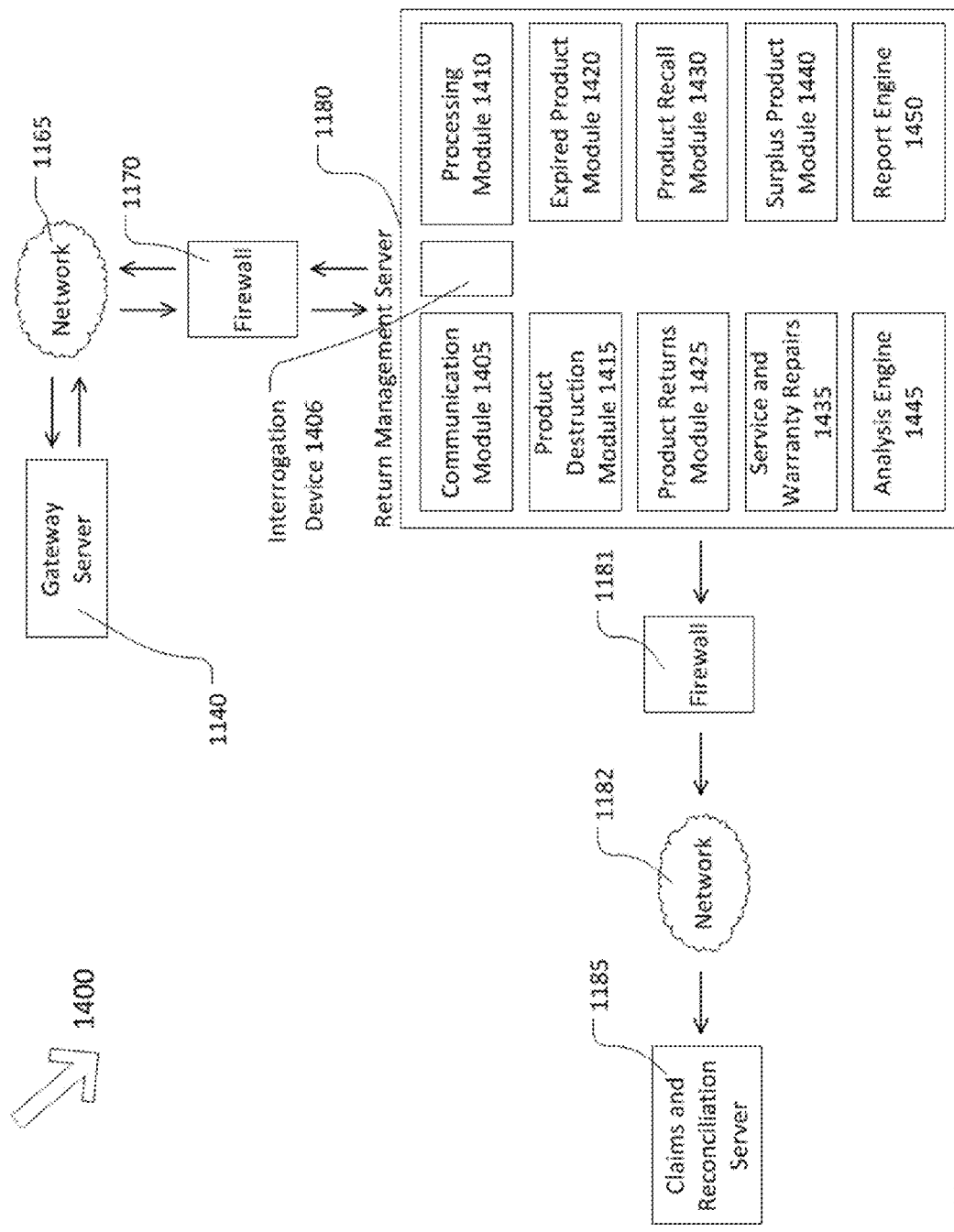
FIG. 14 is a block diagram depicting still more components of the system of FIG. 11.

FIG. 14 is a block diagram 1400 that describes the functional elements of the RMS 1180 and the CRS 1185. As noted above, the brand owner 105 is responsible for the end-to-end management of the supply chain in order to assess its profitability, to meet regulatory and safety requirements, and to meet customer needs. In addition, the brand owner needs to understand, and protect, the brand's interest when an article is returned for various reasons through the reverse supply chain. Trade items/logistical units may be returned to the brand owner for various reasons. The RMS 1180 includes hardware and software programmed to perform certain functions in response to software instructions contained in a computer readable medium. The RMS 1180 includes a communication module 1405, an interrogation device 1406 that captures the identification number and the three-dimensional authentication pattern image. The interrogation device 1406 could be a wireless handheld electronic device having a solid-state imaging module, a cell phone, an RFID reader, or a barcode scanner equipped with an imaging module, a tablet, a computer or like electronic device. The device 1406 is aimed at the trade item/logistical unit to capture return light from the article of commerce. The RMS 1180 also includes a processing module 1410, a product destruction module 1415, an expired product module 1420, a product returns module 1425, a product recall module 1430, a service and warranty repairs module 1435, a surplus product module 1440, an analysis engine 1445, and a report engine 1450. The RMS 1180 hardware may include communication interfaces, input devices, output devices and buses to interconnect the components of the server, such as processors, microprocessors, RAMS, dynamic storage devices, ROMS and other storage devices.

The communication module 1405 receives information from customers, retailers and institutional users, exporters or others when they return articles to the RMS 1180. When the articles come to the brand owner's facilities, they are logged into the RMS 1180 through the communication module 1405. The communication module 1405 also interacts with the gateway server 1140 to receive and send information. The processing module 1410 processes instructions related to the operation of the RMS 1180, e.g., the reason or code for the return. Thus, if the article was returned for warranty, it will have one reason code and, if it was recalled, then it will have another reason code. The reason codes are specified by the brand owner for each type of return, and the expenses incurred due to each type of return (reason code) are kept separately for the CRS 1185. Once the reason code is identified, the processing module 1420 interacts with the gateway server 1140 and sends the identification number and the pattern image information associated with the identification number for authentication captured through interrogation device 1406. The gateway server 1140 then further transmits the captured information to the authentication server 1160. The image pattern and the associated address of the article were stored in the database 1330 of the authentication server 1160 after the label was activated. If a whole logistical unit containing a plurality of items/products was returned, then that logistical unit's serial number and the items/products contained therein and the associated pattern image were also stored in the authentication server. The captured information received by the authentication server 1160 via the gateway server 1140 is compared with the stored reference image at the corresponding address by the processing module 1320 in the authentication server 1160. If there is a match, then the article is deemed authentic, and the result is communicated to the RMS 1180 via the gateway server 1140. If there is no match, then the article is deemed illegal/counterfeit/diverted/overrun/stolen. The brand owner or the RMS 1180 can then communicate with the party that returned the article and also take appropriate action deemed necessary. Information from the RMS 1180 will also be communicated through the communication module 1405 to the CRS 1185 for appropriate control and action.

If the article was found to be authentic, then depending on the reason code for return, all the information on the article including the customer information who returned the article will be stored in the RMS 1180, and a decision made for reconciliation and claims. For example, if the reason code was for warranty and service repair, then this information will be stored in service module 1435. If the article had expired and returned for that reason, then this information will be stored in expired module 1420. If the article was returned for destruction due to safety or other reasons, then this information will be stored in destruction module 1415. Retailers/customers may have ordered too many articles and may request a refund if the articles did not move in the market. And this type of return information will be stored in surplus module 1440. If the articles did not meet the customer's expectations and was returned for that reason, then that type of return will be logged in returns module 1425. If the brand owner has recalled articles from the market, then the information on the recalled articles will be stored in recall module 1430.

The analysis engine 1445 analyzes the customers who returned the articles, the reason codes, the geographical locations from where the articles came, and collects such information as to which returned articles were not authentic and the reasons therefor. The analysis engine 1445 aggregates this data by brands, by supply chain partners, by locations, etc., and may also conduct data mining based on hardware or software logic and based on the request by the brand owner. The report engine 1450 creates reports for each brand manager in the format specified by the brand owner based on the analysis engine 1445 and communicates these reports through the communication module 1405 to the brand owner for action.

Reference numeral 1500 in FIG. 15 generally identifies an exemplary multi-field database structure that collects and stores data showing articles of commerce that have been requested for tracking and authentication at a plurality of points in a supply chain for report to each brand owner. The brand ID is included in field 1510. The field 1515 shows the brand name and the address of the brand location that is tracking the supply chain integrity. Field 1520 includes the time period for which the data has been collected for communicating to the brand owner. Any other information regarding the brand may be included in 1525. The field 1530 includes the ID of the articles of commerce that are being tracked, traced and authenticated in the supply chain. This field 1530 will include the hierarchical information and the unique serial number of the product/item, the logistical unit/shipment as the articles moves along the supply chain. The field 1535 shows whether or not the articles of commerce were included in the label management server 1110. The field 1540 shows whether or not articles of commerce were activated, and the field 1545 shows whether or not the articles of commerce were authenticated. The field 1550 shows the locations for each article of commerce where tracking and authentication attempts were made, and may include the specific location, address and city. The field 1555 shows the time when tracking and authentication attempts were made, and the field 1560 shows the date of the attempt. The field 1570 may include any other information that the brand owner may require from the tracking, tracing and authentication system to assure supply chain integrity. The database structure 1500 is only exemplary and is not meant to be all-inclusive. The information as compiled in the database structure 1500 is used to produce reports for each brand owner 105 and for detective and law enforcement agencies 1360 to know where and when the supply chain was breached.

Figure 16:
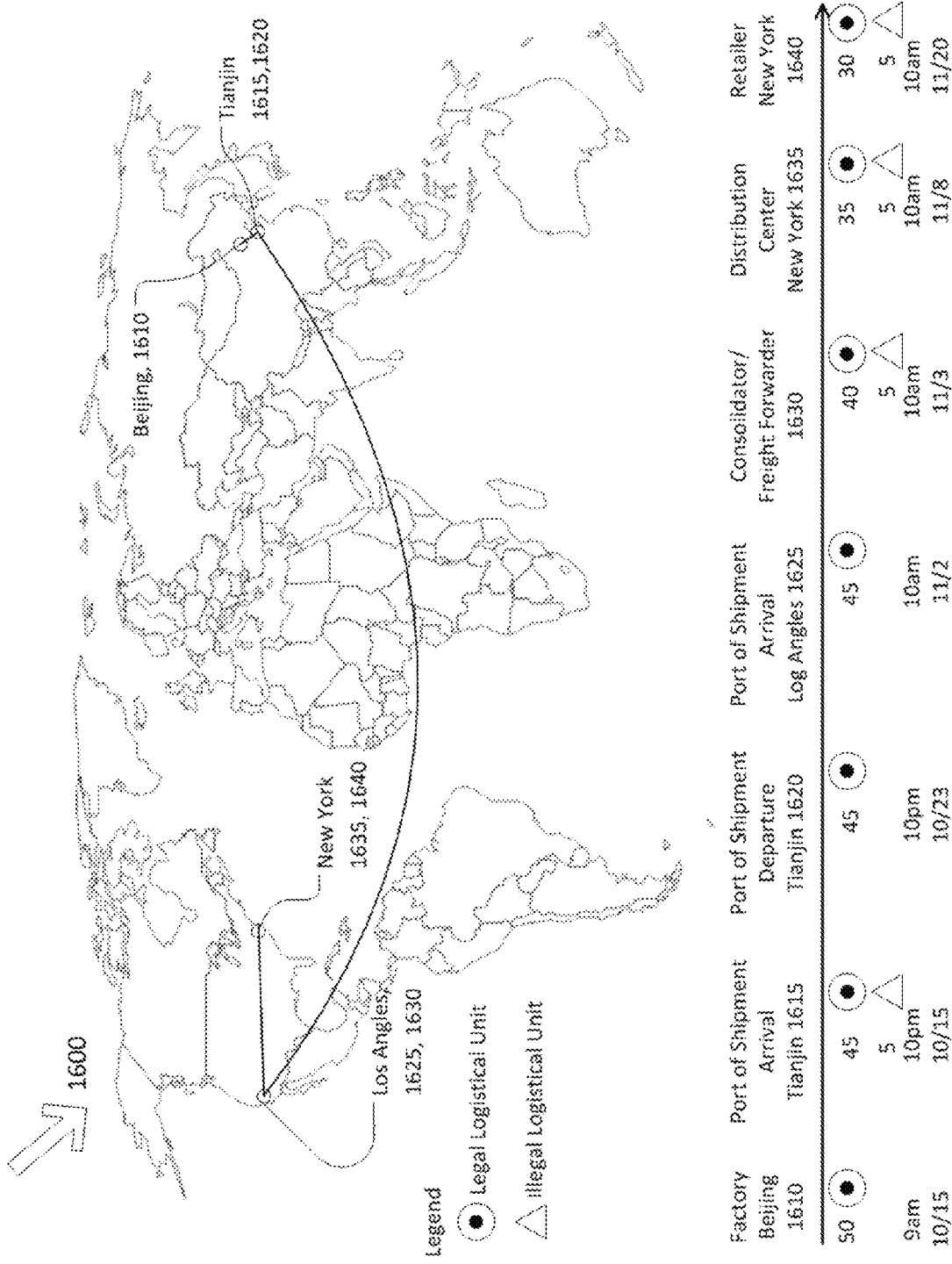
FIG. 16 is a geographic representation of exemplary points along the supply chain of FIG. 1.

Reference numeral 1600 in FIG. 16 generally illustrates a geographical representation of an exemplary supply chain flow from a source point 1610 in Beijing, China, to a destination point 1640 in New York, N.Y., USA, via an intermediate point 1615 or port of exit in Tianjin, China, and via another intermediate point 1625 or port of entry in Los Angeles, Calif., USA, and some problem areas along the supply chain to be monitored by the brand owner 105. In this supply chain, logistical units are being tracked and authenticated from a manufacturing factory in Beijing, China, where a number, e.g., fifty, of logistical units were contracted by the brand owner 105 for manufacturing at location 1610 for shipment to a retailer at point 1640 in New York, USA. At location 1610, all fifty logistical units were, for example, loaded onto trucks at 9:00 am local time on the date of Oct. 15, 2011 and were found to be legal. However, when the logistical units arrived at the Tianjin port at point 1615 at 10:00 am local time on the date of Oct. 15, 2011, five of the logistical units were found to be illegal. These illegal units can be removed and returned under the direction of the brand owner.

The remaining legal forty-five logistical units left the point 1620 at 10:00 am local time on the date of Oct. 23, 2011 and arrived at point 1625 at 10:00 am local time on the date of Nov. 2, 2011. When the shipment arrived at point 1620, no breach of security was discovered in the shipment and all forty-five logistical units were found to be legal. All forty-five logistical units were then moved to a consolidator/freight forwarder at point 1630 and arrived there at 10:00 am local time on the date of Nov. 3, 2011. However, at point 1630, only forty logistical units were found to be legal, and five were found to be illegal/fake. The freight forwarder can remove and return these five illegal units under the direction of the brand owner 105.

The remaining legal forty logistical units left the point 1630 and arrived at a distribution center at point 1635 at 10:00 am local time on the date of Nov. 8, 2011. However, at point 1635, only thirty-five logistical units were found to be legal, and five were found to be illegal/fake. The distribution center may remove and return these five illegal logistical units under the direction of the brand owner 105.

The remaining legal thirty-five logistical units left the point 1635 and arrived at the retailer at point 1640 at 10:00 am local time on the date of Nov. 20, 2011. However, at point 1640, only thirty logistical units were found to be legal, and five were found to be illegal/fake. The retailer may remove and return these five illegal logistical units under the direction of the brand owner 105.

This description of problem areas along the supply chain in FIG. 16 is only exemplary and shows how this invention prevents the flow of unauthorized/illegal articles along the supply chain. As described earlier, the various points where the supply chain can be compromised are too numerous, and various embodiments of this invention are possible. FIG. 16 described problems in transportation. However, the problem areas could be product overruns at the factory, or at the freight consolidator, or at the exporter/importer, or at the institutional users, or at the central distributor, or at the regional or local distributors, or at transporters between any points, or at any combination of these or additional entry and exit points in the supply chain. Overruns, diversion, counterfeiting, and theft, etc. are all part of the unauthorized/illegal supply chain. This description is not restrictive and anybody proficient in art can appreciate multiple variations and various embodiments possible.

It will be understood that each of the elements described above, or two or more together, also may find a useful application in other types of constructions differing from the types described above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The terms labels and tags have been used interchangeably in this disclosure. The term label includes not only something that can be affixed to an article of commerce, e.g., a product or a logistical unit, but also materials that can be embedded into such articles of commerce. For example, embedded materials with a three-dimensional authentication pattern feature can be part of packaging material, textile, or cardboard, or can be deposited on the surface of any such article of commerce. This embedded or deposited materials will act as an authentication pattern image and, combined with the identification (ID) information, will constitute a label or tag within the context of this disclosure.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of securing articles of commerce passing through points along a supply chain, comprising:
    affixing a plurality of labels on the articles, one label for each article, each label having a first dataset configured as a random distribution of three-dimensional, light-modifying, raised elements as the authentication information, and a second dataset configured as data elements as the identification information;
    capturing the authentication information and the identification information from a label respectively associated with an article with an interrogation device at least one of the points in the supply chain;
    authenticating the article from the captured authentication information as being authorized or unauthorized at the at least one point based on the elevation of the raised elements relative to the label;
    identifying the article from the captured identification information at the at least one point; and
    sending transactional information about the article in response to the authenticating and identifying.

2. The method of claim 1, wherein the capturing is performed by imaging the authentication information to generate an image pattern; and wherein the authenticating is performed by comparing the image pattern with a reference authentication signature, and by indicating that the article is authorized when the image pattern matches the reference authentication signature.

3. The method of claim 1, and capturing void information when an attempt to disassociate the label from the article is made, and wherein the authenticating is performed by determining that the article is unauthorized from the captured void information, and wherein the sending is performed by reporting the captured void information.

4. The method of claim 1, and activating the labels by capturing the authentication information and the identification information at a secure one of the points in the supply chain, and by storing the authentication information and the identification information captured at the secure point in a database; and wherein the authenticating and the identifying performed at the at least one point in the supply chain compares the authentication information and the identification information captured at the at least one point with the authentication information and the identification information stored in the database.

5. The method of claim 1, and determining at least one of a time and a place at which the capturing, authenticating, and identifying are performed, and wherein the sending is performed by sending at least one of the time and the place to one of a brand manager and law enforcement.

6. The method of claim 5, wherein the determining of the place is performed at a plurality of points in the supply chain, and wherein the sending is performed by reporting all of the places to track the article along the supply chain.

7. The method of claim 1, wherein the sending is performed by sending the transactional information to one of a brand manager and law enforcement.

8. The method of claim 7, wherein the sending is performed in response to a query from the one of the brand manager and the law enforcement.

9. The method of claim 1, wherein the capturing, authenticating, identifying, and sending are performed for any of the articles, including products, logistical units for conveying the products, services, and documents relating to the products and the services, and at any of the points in the supply chain, including at captive manufacturers, outside manufacturers, importers, exporters, freight forwarders, repackagers, central distributors, regional distributors, local distributors, retailers, institutional users, end users, and return centers.

10. A system for securing articles of commerce passing through points along a supply chain, comprising:
 a plurality of labels affixed on the articles, one label for each article, each label having a first dataset configured as a random distribution of three-dimensional, light-modifying, raised elements as the authentication information, and a second dataset configured as data elements as the identification information;
 an interrogation device for capturing the authentication information and the identification information from a label respectively associated with an article at least one of the points in the supply chain;
 a server for identifying the article from the captured identification information at the at least one point, and for authenticating the article from the captured authentication information as being authorized or unauthorized at the at least one point based on the elevation of the raised elements relative to the label; and
 a report engine for sending transactional information about the article in response to the authenticating and identifying server.

11. The system of claim 10, wherein the interrogation device is operative for imaging the authentication information to generate an image pattern; and wherein the server is operative for comparing the image pattern with a reference authentication signature, and for indicating that the article is authorized when the image pattern matches the reference authentication signature.

12. The system of claim 10, wherein the interrogation device is operative for capturing void information when an attempt to disassociate the label from the article is made, and wherein the server is operative for determining that the article is unauthorized from the captured void information, and wherein the report engine is operative for reporting the captured void information.

13. The system of claim 10, and a label manufacturing facility operative for creating the labels; and a label activating facility operative for activating the labels by capturing the authentication information and the identification information at a secure one of the points in the supply chain, and for storing the authentication information and the identification information captured at the secure point in a database; and wherein the server at the at least one point in the supply chain compares the authentication information and the identification information captured at the at least one point with the authentication information and the identification information stored in the database.

14. The system of claim 10, wherein the server is operative for determining at least one of a time and a place at which the article is to be secured, and wherein the report engine is operative for reporting at least one of the time and the place to one of a brand manager and law enforcement.

15. The system of claim 14, wherein the server is operative for determining all the places at which the article is to be secured at a plurality of points in the supply chain, and wherein the report engine is operative for reporting all of the places to track the article along the supply chain.

16. The system of claim 10, wherein the report engine is operative for reporting the transactional information to one of a brand manager and law enforcement.

17. The system of claim 16, wherein the report engine is operative for reporting the transactional information in response to a query from the one of the brand manager and the law enforcement.

18. The system of claim 10, and a return management server operative for processing article returns.

19. The system of claim 10, and an analysis server operative for analyzing the status and progress of the articles passing along the supply chain.

20. The system of claim 10, wherein the articles include products, logistical units for conveying the products, services, and documents relating to the products and the services, and wherein the points include captive manufacturers, outside manufacturers, importers, exporters, freight forwarders, repackagers, central distributors, regional distributors, local distributors, retailers, institutional users, end users, and return centers.

* * * * *